US012684611B2

(12) United States Patent
Ibrahim et al.

(10) Patent No.: US 12,684,611 B2
(45) Date of Patent: Jul. 14, 2026

(54) HANDLING AN UPLINK RESOURCE MUTING PATTERN THAT OVERLAPS WITH A PHASE TRACKING REFERENCE SIGNAL IN A SUBBAND FULL DUPLEX OPERATION

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 18/495,342

(22) Filed: Oct. 26, 2023

(65) Prior Publication Data

US 2025/0142613 A1      May 1, 2025

(51) Int. Cl.
*H04W 72/563*      (2023.01)
*H04L 5/00*      (2006.01)

(52) U.S. Cl.
CPC ......... *H04W 72/563* (2023.01); *H04L 5/0051* (2013.01)

(58) Field of Classification Search
CPC .... H04W 72/563; H04L 5/0035; H04L 5/005; H04L 5/0051; H04L 5/0092; H04L 5/14
USPC ....................................................... 370/329
See application file for complete search history.

(56) References Cited

U.S. PATENT DOCUMENTS

| | | | | | |
|---|---|---|---|---|---|
| 10,862,649 | B2 * | 12/2020 | Yoo | ........................ | H04L 5/0048 |
| 11,147,091 | B2 * | 10/2021 | Yokomakura | ......... | H04W 76/27 |
| 11,997,037 | B2 * | 5/2024 | Lee | ........................ | H04L 5/0051 |
| 2009/0249153 | A1 * | 10/2009 | Zhang | ................... | H04W 72/04 |
| | | | | | 714/E11.131 |

(Continued)

FOREIGN PATENT DOCUMENTS

| | | | | | |
|---|---|---|---|---|---|
| EP | 3644540 | A1 * | 4/2020 | ......... | H04L 27/2688 |

OTHER PUBLICATIONS

Chen T (Mediatek Inc)., et al., "Discussion on Subband Non-Overlapping Full Duplex for NR", 3GPP TSG RAN WG1 Meeting #112, R1-2301594, Type Discussion, FS_NR_Duplex _EVO, 3rd Generation Partnership Project, Mobile Competence Centre, 650, Route Des Lucioles, F-06921 Sophia-Antipolis Cedex, France, vol. 3GPP RAN 1, No. Athens, GR, Feb. 27, 2023-Mar. 3, 2023, Feb. 18, 2023, 16 pages, XP052248724, section 2.1.2.

CMCC: "Discussion on Potential Enhancements on Flexible/Dynamic TDD", 3GPP TSG RAN WG1 #112, R1-2301001, Type Discussion, FS NR_Duplex_EVO, 3rd Generation Partnership Project, Mobile Competence Centre ; 650, Route Des Lucioles ; F-06921 Sophia-Antipolis Cedex, France, vol. RAN WG1, No. Athens, GR, Feb. 27, 2023- Mar. 3, 2023, Feb. 17, 2023, 7 pages, XP052248144, section 3.1.

(Continued)

*Primary Examiner* — Jean A Gelin
(74) *Attorney, Agent, or Firm* — Harrity & Harrity, LLP

(57)      ABSTRACT
Various aspects of the present disclosure generally relate to wireless communication. In some aspects, a user equipment (UE) may receive a configuration associated with an uplink phase tracking reference signal (PTRS). The UE may receive an indication of an uplink resource muting pattern, wherein the uplink resource muting pattern overlaps with a physical uplink shared channel (PUSCH) carrying the uplink PTRS in a subband full duplex operation. The UE may perform a handling of the uplink resource muting pattern that overlaps with the PUSCH carrying the uplink PTRS. Numerous other aspects are described.

30 Claims, 14 Drawing Sheets

(56)  References Cited

U.S. PATENT DOCUMENTS

| | | | | |
|---|---|---|---|---|
| 2012/0040696 A1* | 2/2012 | Siomina | ............... | G01S 5/0268 |
| | | | | 455/456.6 |
| 2012/0120854 A1* | 5/2012 | Zhang | .................. | H04B 7/2656 |
| | | | | 370/280 |
| 2019/0182001 A1* | 6/2019 | Lee | ....................... | H04W 52/34 |
| 2019/0215118 A1* | 7/2019 | Molés Cases | ........ | H04L 5/0051 |
| 2020/0021470 A1* | 1/2020 | Sun | ......................... | H04L 25/02 |
| 2020/0228384 A1* | 7/2020 | Saito | ..................... | H04L 27/261 |
| 2021/0068130 A1* | 3/2021 | Liu | .................... | H04W 72/0453 |
| 2021/0136736 A1* | 5/2021 | Yang | ..................... | H04W 72/23 |
| 2021/0250915 A1* | 8/2021 | Yoo | ....................... | H04L 5/0026 |
| 2021/0336820 A1* | 10/2021 | Lim | ...................... | H04W 80/02 |
| 2022/0312334 A1* | 9/2022 | Gao | ....................... | H04L 1/0003 |
| 2023/0232415 A1* | 7/2023 | Kim | .................... | H04W 72/232 |
| | | | | 370/329 |
| 2024/0250791 A1* | 7/2024 | Mei | ....................... | H04L 5/0094 |
| 2024/0267261 A1* | 8/2024 | Peralta Calvo | ....... | H04L 5/0073 |
| 2025/0047442 A1* | 2/2025 | Ahmadzadeh | ........ | H04W 76/20 |
| 2025/0226953 A1* | 7/2025 | Gan | ...................... | H04L 5/0051 |
| 2025/0286669 A1* | 9/2025 | Xiao | ..................... | H04L 5/0035 |
| 2025/0300781 A1* | 9/2025 | Liu | ...................... | H04B 7/0456 |

OTHER PUBLICATIONS

Huawei, et al., "Study on Potential Enhancements on Dynamic/Flexible TDD", 3GPP TSG-RAN WG1 Meeting #112, R1-2300088, Type Discussion, FS_NR_Duplex_EVO, Rd Generation Partnership Project, Mobile Competence Centre, 650, Route Des Lucioles, F-06921 Sophia-Antipolis Cedex, France, vol. RAN WG1, No. Athens, GR, Feb. 27, 2023-Mar. 3, 2023, Feb. 17, 2023, 24 pages, XP052247241, section 2.1-2.2.

International Search Report and Written Opinion—PCT/US2024/044009—ISA/EPO—Dec. 16, 2024.

Sony: "Considerations On Flexible/Dynamic TDD", 3GPP TSG RAN WG1 #112, R1-2300874, Type Discussion, FS_NR_Duplex_EVO, 3rd Generation Partnership Project, Mobile Competence Centre, 650, Route Des Lucioles, F-06921 Sophia-Antipolis Cedex, France, vol. Ran WG1, No. Athens, GR, Feb. 27, 2023-Mar. 3, 2023, Feb. 17, 2023, 12 pages, XP052248017, section 2.1.

* cited by examiner

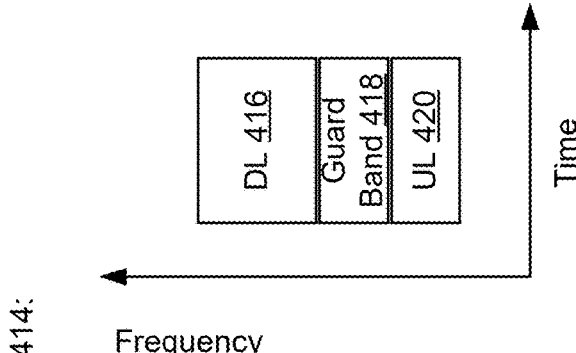
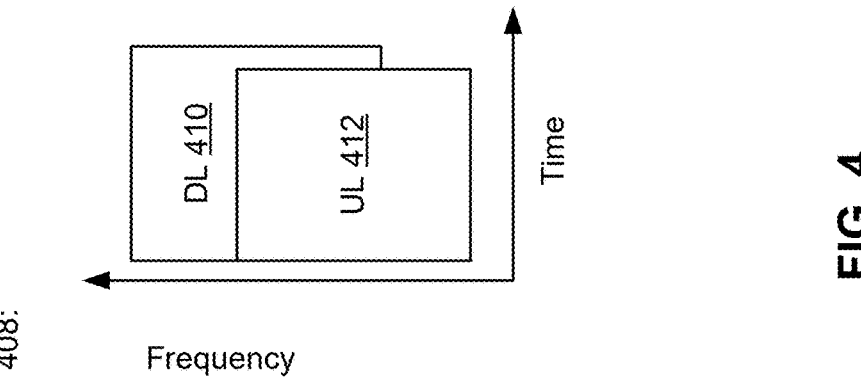
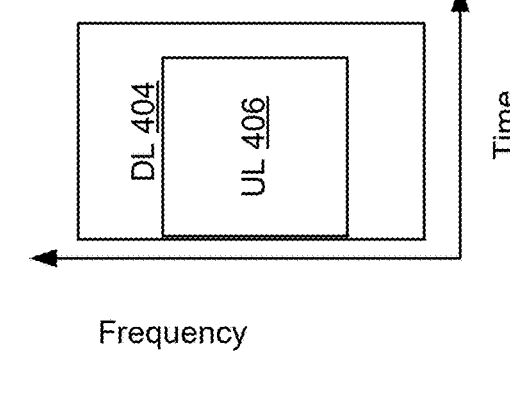
FIG. 4

500
502: FD gNB and HD UEs
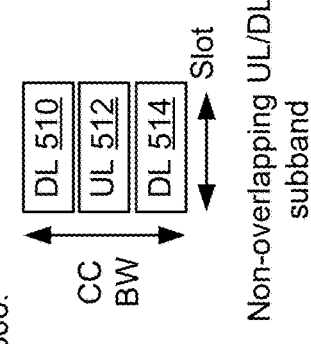
504: FD gNB and FD UEs
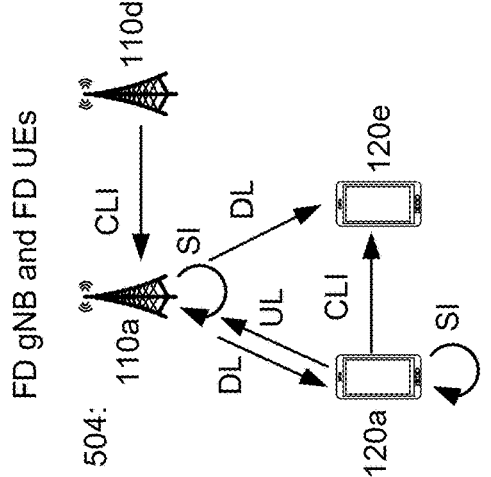
506: FD gNB (M-TRP) and SBFD UEs
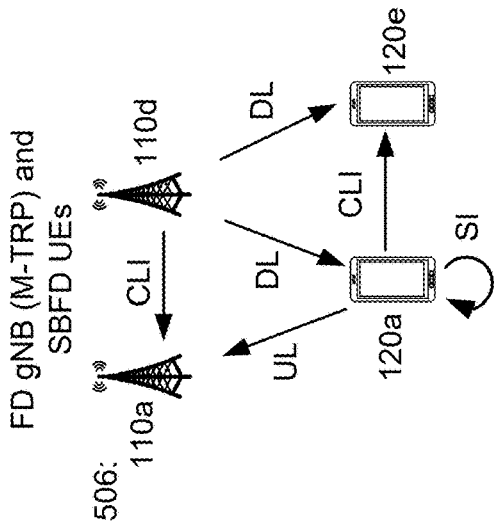
508:
| DL 510 | UL 512 | DL 514 |
CC BW
Non-overlapping UL/DL subband
Slot
FIG. 5

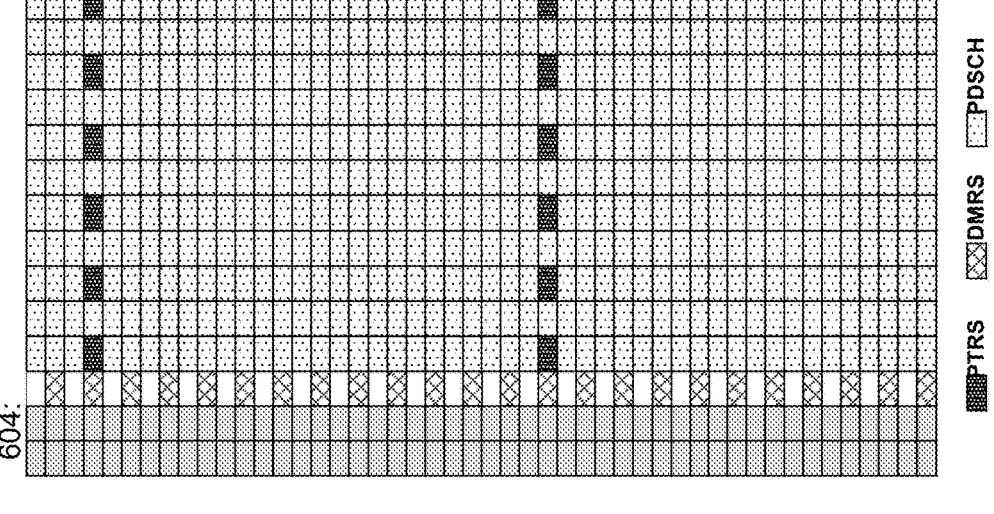
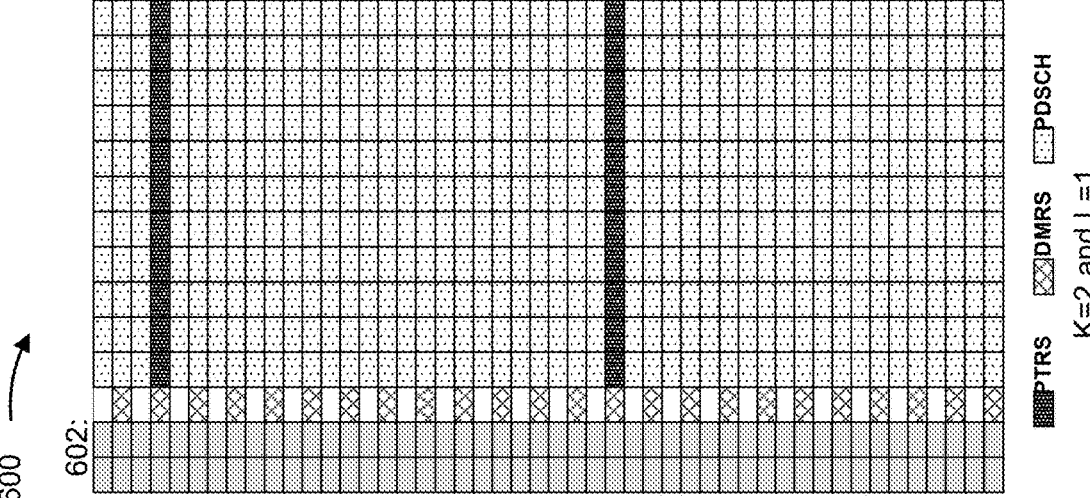
FIG. 6

800

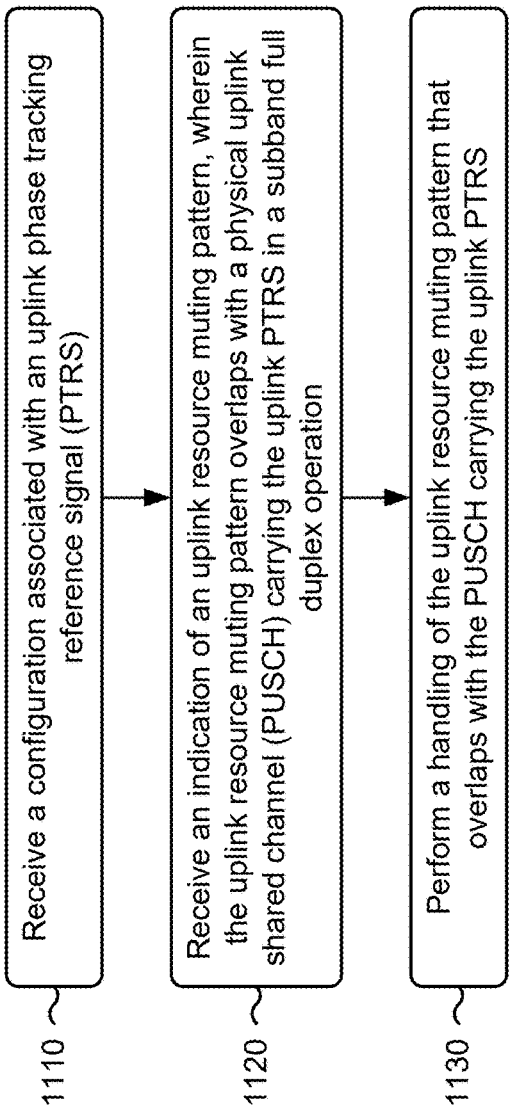

1110  Receive a configuration associated with an uplink phase tracking reference signal (PTRS)

1120  Receive an indication of an uplink resource muting pattern, wherein the uplink resource muting pattern overlaps with a physical uplink shared channel (PUSCH) carrying the uplink PTRS in a subband full duplex operation 1130  Perform a handling of the uplink resource muting pattern that overlaps with the PUSCH carrying the uplink PTRS

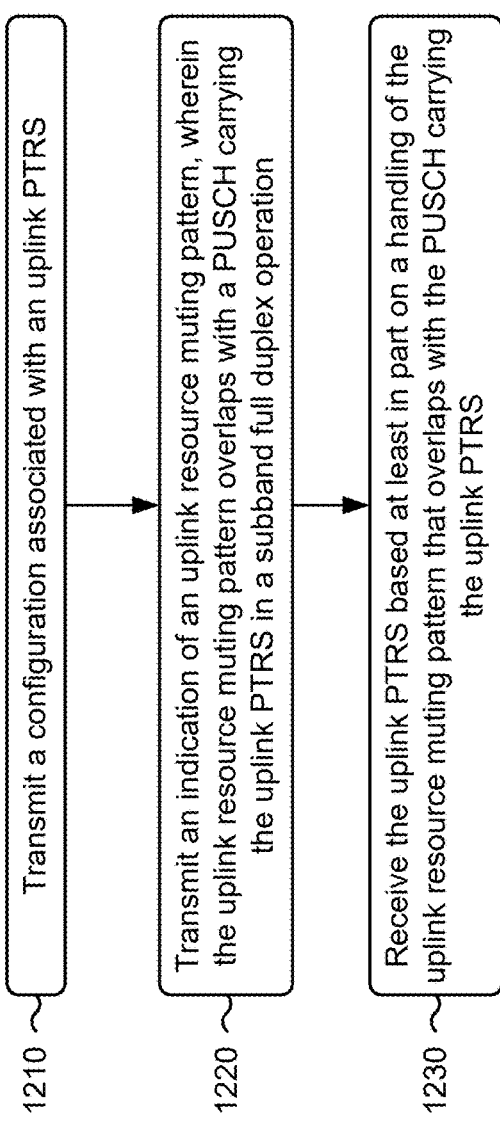

1210 — Transmit a configuration associated with an uplink PTRS

1220 — Transmit an indication of an uplink resource muting pattern, wherein the uplink resource muting pattern overlaps with a PUSCH carrying the uplink PTRS in a subband full duplex operation 1230 — Receive the uplink PTRS based at least in part on a handling of the uplink resource muting pattern that overlaps with the PUSCH carrying the uplink PTRS

Reception Component 1302

Communication Manager 1306

Transmission Component 1304

1400

Reception Component 1402

Communication Manager 1406

Transmission Component 1404

1408

HANDLING AN UPLINK RESOURCE MUTING PATTERN THAT OVERLAPS WITH A PHASE TRACKING REFERENCE SIGNAL IN A SUBBAND FULL DUPLEX OPERATION

FIELD OF THE DISCLOSURE

Aspects of the present disclosure generally relate to wireless communication and specifically relate to techniques, apparatuses, and methods for handling an uplink resource muting pattern that overlaps with a phase tracking reference signal (PTRS) in a subband full duplex (SBFD) operation.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

In some implementations, an apparatus for wireless communication at a user equipment (UE) includes memory; and one or more processors, coupled to the memory, configured to cause the UE to: receive a configuration associated with an uplink phase tracking reference signal (PTRS); receive an indication of an uplink resource muting pattern, wherein the uplink resource muting pattern overlaps with a physical uplink shared channel (PUSCH) carrying the uplink PTRS in a subband full duplex (SBFD) operation; and perform a handling of the uplink resource muting pattern that overlaps with the PUSCH carrying the uplink PTRS.

In some implementations, an apparatus for wireless communication at a network node includes memory; and one or more processors, coupled to the memory, configured to cause the network node to: transmit a configuration associated with an uplink PTRS; transmit an indication of an uplink resource muting pattern, wherein the uplink resource muting pattern overlaps with a PUSCH carrying the uplink PTRS in an SBFD operation; and receive the uplink PTRS based at least in part on a handling of the uplink resource muting pattern that overlaps with the PUSCH carrying the uplink PTRS.

In some implementations, a method of wireless communication performed by a UE includes receiving a configuration associated with an uplink PTRS; receiving an indication of an uplink resource muting pattern, wherein the uplink resource muting pattern overlaps with a PUSCH carrying the uplink PTRS in an SBFD operation; and performing a handling of the uplink resource muting pattern that overlaps with the PUSCH carrying the uplink PTRS.

In some implementations, a method of wireless communication performed by a network node includes transmitting a configuration associated with an uplink PTRS; transmitting an indication of an uplink resource muting pattern, wherein the uplink resource muting pattern overlaps with a PUSCH carrying the uplink PTRS in an SBFD operation; and receiving the uplink PTRS based at least in part on a handling of the uplink resource muting pattern that overlaps with the PUSCH carrying the uplink PTRS.

In some implementations, a non-transitory computer-readable medium storing a set of instructions for wireless communication includes one or more instructions that, when executed by one or more processors of a UE, cause the UE to: receive a configuration associated with an uplink PTRS; receive an indication of an uplink resource muting pattern, wherein the uplink resource muting pattern overlaps with a PUSCH carrying the uplink PTRS in an SBFD operation; and perform a handling of the uplink resource muting pattern that overlaps with the PUSCH carrying the uplink PTRS.

In some implementations, a non-transitory computer-readable medium storing a set of instructions for wireless communication includes one or more instructions that, when executed by one or more processors of a network node, cause the network node to: transmit a configuration associated with an uplink PTRS; transmit an indication of an uplink resource muting pattern, wherein the uplink resource muting pattern overlaps with a PUSCH carrying the uplink PTRS in an SBFD operation; and receive the uplink PTRS based at least in part on a handling of the uplink resource muting pattern that overlaps with the PUSCH carrying the uplink PTRS.

In some implementations, an apparatus for wireless communication includes means for receiving a configuration associated with an uplink PTRS; means for receiving an indication of an uplink resource muting pattern, wherein the uplink resource muting pattern overlaps with a PUSCH carrying the uplink PTRS in an SBFD operation; and means for performing a handling of the uplink resource muting pattern that overlaps with the PUSCH carrying the uplink PTRS.

In some implementations, an apparatus for wireless communication includes means for transmitting a configuration associated with an uplink PTRS; means for transmitting an indication of an uplink resource muting pattern, wherein the uplink resource muting pattern overlaps with a PUSCH carrying the uplink PTRS in an SBFD operation; and means for receiving the uplink PTRS based at least in part on a handling of the uplink resource muting pattern that overlaps with the PUSCH carrying the uplink PTRS.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIG. 4 is a diagram illustrating examples of full duplex (FD) communications, in accordance with the present disclosure.

FIG. 5 is a diagram illustrating examples of FD communications, in accordance with the present disclosure.

FIG. 6 is a diagram illustrating an example of phase tracking reference signal (PTRS) patterns, in accordance with the present disclosure.

FIG. 11 is a flowchart illustrating an example process performed, for example, by a UE, in accordance with the present disclosure.

FIG. 12 is a flowchart illustrating an example process performed, for example, by a network node, in accordance with the present disclosure.

DETAILED DESCRIPTION

Figure 1:
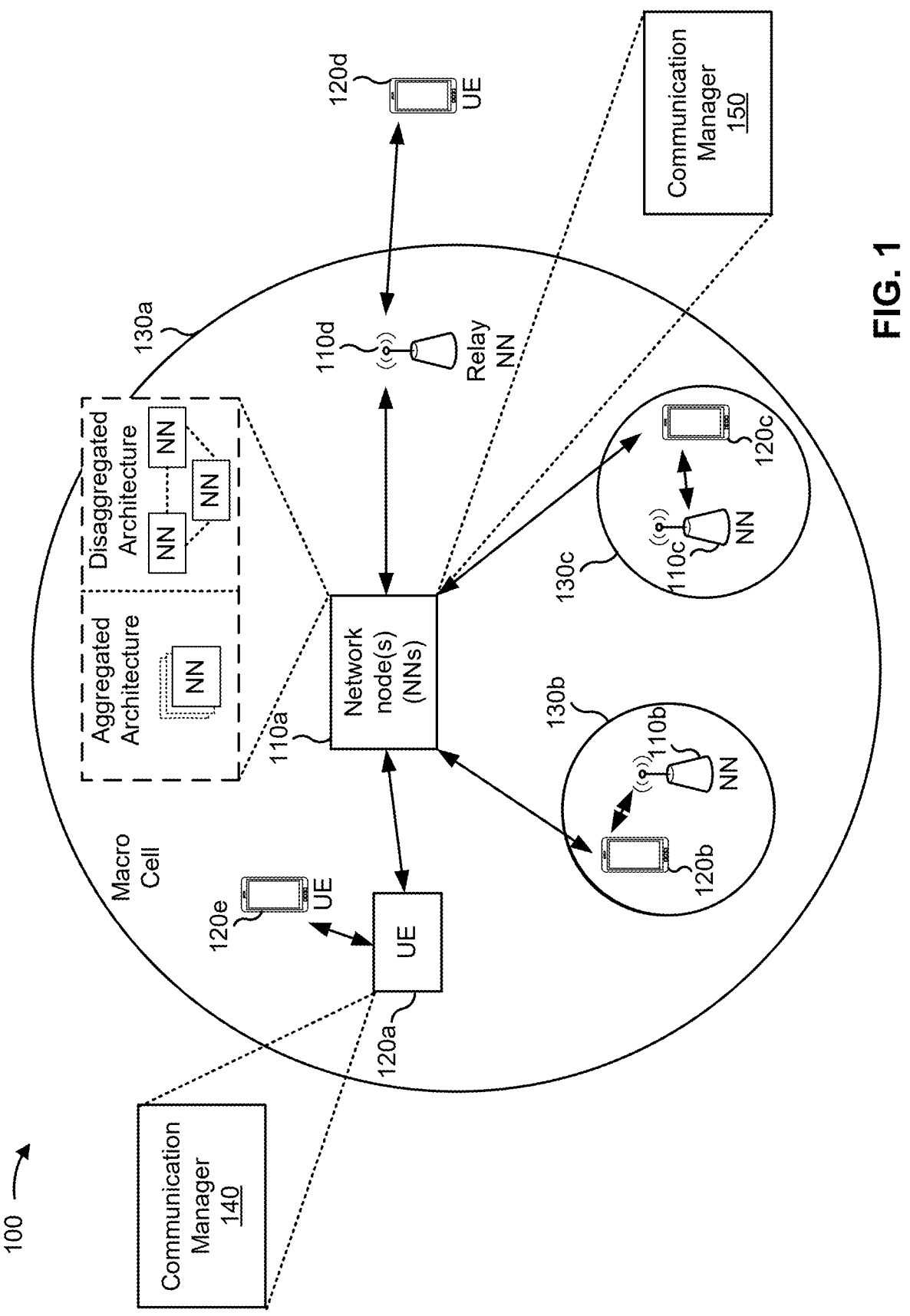
FIG. 1 is a diagram illustrating an example of a wireless network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A full duplex (FD) operation may involve an in-band full duplex (IBFD) operation, in which a transmission and a reception may occur on the same time and frequency resource. A downlink direction and an uplink direction may share the same IBFD time/frequency resource based at least in part on a full or partial overlap. Alternatively, the FD operation may involve a subband full duplex (SBFD) (or flexible duplex) operation, in which a transmission and a reception may occur at the same time but on different frequency resources. A downlink resource may be separated from an uplink resource in a frequency domain. In the SBFD operation, no downlink and uplink overlap in frequency may occur.

Uplink resource muting may be used to support an inter-network-node cross-link interference (CLI) measurement. Different uplink blank/muting resources may be used to measure spatial characteristics of network-node-to-network-node CLI caused by various downlink signals and to avoid cross link interference. An uplink resource muting pattern may be different for various downlink channels and/or downlink signals.

A phase tracking reference signal (PTRS) may be used for tracking a phase of a local oscillator at a receiver and a transmitter. Phase tracking may enable a suppression of phase noise and common phase error, which may be useful at high carrier frequencies such as millimeter waves. Due to properties of phase noise, the PTRS may have a relatively low density in a frequency domain but a relatively high density in a time domain.

A user equipment (UE) may be configured with an uplink resource muting pattern, where the uplink resource muting pattern may overlap with a physical uplink shared channel (PUSCH) carrying a PTRS signal. The uplink resource muting pattern and the PUSCH carrying the PTRS signal may overlap in an uplink resource, where the uplink resource may be associated with an SBFD slot. The SBFD slot may include a first downlink resource, a second downlink resource, and the uplink resource in between the first downlink resource and the second downlink resource in a frequency domain, where the uplink resource is associated with the uplink resource muting pattern overlapping with the PUSCH carrying the PTRS signal.

The UE may not be configured to handle this overlapping scenario. The UE may not be configured to handle a situation in which the UE is configured with the uplink resource muting pattern that overlaps with the PUSCH carrying the PTRS signal. Due to the uplink resource muting pattern, certain uplink resources may be muted, and such uplink resources may overlap with the PUSCH carrying the PTRS signal, thereby preventing the PTRS signal from being conveyed. Further, the PTRS may be used for phase error tracking, so the UE may not consider an impact on performance when handling the overlapping scenario. Due to an inability to handle the overlapping scenario, the UE may suffer from a phase error tracking degradation, thereby negatively affecting an overall performance of the UE.

Various aspects relate generally to handling an uplink resource muting pattern that overlaps with a PTRS. Some aspects more specifically relate to handling an uplink resource muting pattern that overlaps with a PUSCH carrying an uplink PTRS in an SBFD operation. In some aspects, a UE may receive, from a network node, a configuration associated with the uplink PTRS. The UE may receive, from the network node, an indication of the uplink resource muting pattern. The uplink resource muting pattern may overlap (e.g., in time and/or in frequency) with a PUSCH carrying the uplink PTRS in an SBFD operation. The network node may be associated with an FD operation. The UE may perform a handling of the uplink resource muting pattern that overlaps with the PUSCH carrying the uplink PTRS. For example, the UE may prioritize the uplink resource muting pattern over the uplink PTRS. Alternatively, the UE may prioritize the uplink PTRS over the uplink resource muting pattern. The UE may transmit, to the network node, the uplink PTRS via the PUSCH based at least in part on the uplink PTRS being prioritized over the uplink resource muting pattern in accordance with the handling. Alternatively, the UE may mute an uplink resource using the uplink resource muting pattern based at least in part on the uplink resource muting pattern being prioritized over the uplink PTRS in accordance with the handling.

Particular aspects of the subject matter described in this disclosure can be implemented to realize one or more of the following potential advantages. In some examples, by configuring the UE to be able to handle an overlapping scenario in which the uplink resource muting pattern overlaps with the PUSCH carrying the uplink PTRS, the described techniques can be used to allow the UE to transmit the uplink PTRS and/or mute an uplink resource using the uplink resource muting pattern in the presence of the overlap. The uplink PTRS may be on separate symbols and/or on separate REs of a same symbol based at least in part on the handling, as opposed to colliding with each other, which may improve an overall performance of the UE. In some cases, the UE may handle the overlapping scenario depending on a priority of the uplink PTRS in relation to a priority of the uplink resource muting pattern. Further, in some cases, the UE may still be able to transmit the uplink PTRS based at least in part on the handling, which may improve a phase error tracking for the UE.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein May enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular radio access technology (RAT) (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or a non-terrestrial network (NTN) network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110a may be a macro network node for a macro cell 130a, the network node 110b may be a pico network node for a pico cell 130b, and the network node 110c may be a femto network node for a femto cell 130c. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more PUSCHs. The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks (RBs), and/or resource elements (REs)), and/or spatial domain resources (particular transmit directions and/or beam parameters). Frequency domain resources of some bands may be subdivided into bandwidth parts (BWPs). A BWP may be a continuous block of frequency domain resources (for example, a continuous block of RBs) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an extended reality (XR) device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs"). An MTC UE may be, may include, or may be included in or coupled with a robot, an unmanned aerial vehicle or drone, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of ultra-reliable low-latency communication (URLLC), enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120a and UE 120e) may communicate directly with one another using sidelink communications (for example, without communicating by way of a network node 110 as an intermediary). As an example, the UE 120a may directly transmit data, control information, or other signaling as a sidelink communication to the UE 120e. This is in contrast to, for example, the UE 120a first transmitting data in an UL communication to a network node 110, which then transmits the data to the UE 120e in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some radio access technologies (RATs) may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, a UE (e.g., the UE 120) may include a communication manager 140. As described in more detail elsewhere herein, the communication manager 140 may receive a configuration associated with an uplink PTRS; receive an indication of an uplink resource muting pattern, wherein the uplink resource muting pattern overlaps with a PUSCH carrying the uplink PTRS in an SBFD operation; and perform a handling of the uplink resource muting pattern that overlaps with the PUSCH carrying the uplink PTRS. Additionally, or alternatively, the communication manager 140 may perform one or more other operations described herein.

In some aspects, a network node (e.g., the network node 110) may include a communication manager 150. As described in more detail elsewhere herein, the communication manager 150 may transmit a configuration associated with an uplink PTRS; transmit an indication of an uplink resource muting pattern, wherein the uplink resource muting pattern overlaps with a PUSCH carrying the uplink PTRS in an SBFD operation; and receive the uplink PTRS based at least in part on a handling of the uplink resource muting pattern that overlaps with the PUSCH carrying the uplink PTRS. Additionally, or alternatively, the communication manager 150 may perform one or more other operations described herein.

As indicated above, FIG. 1 is provided as an example. Other examples may differ from what is described with regard to FIG. 1.

Figure 2:
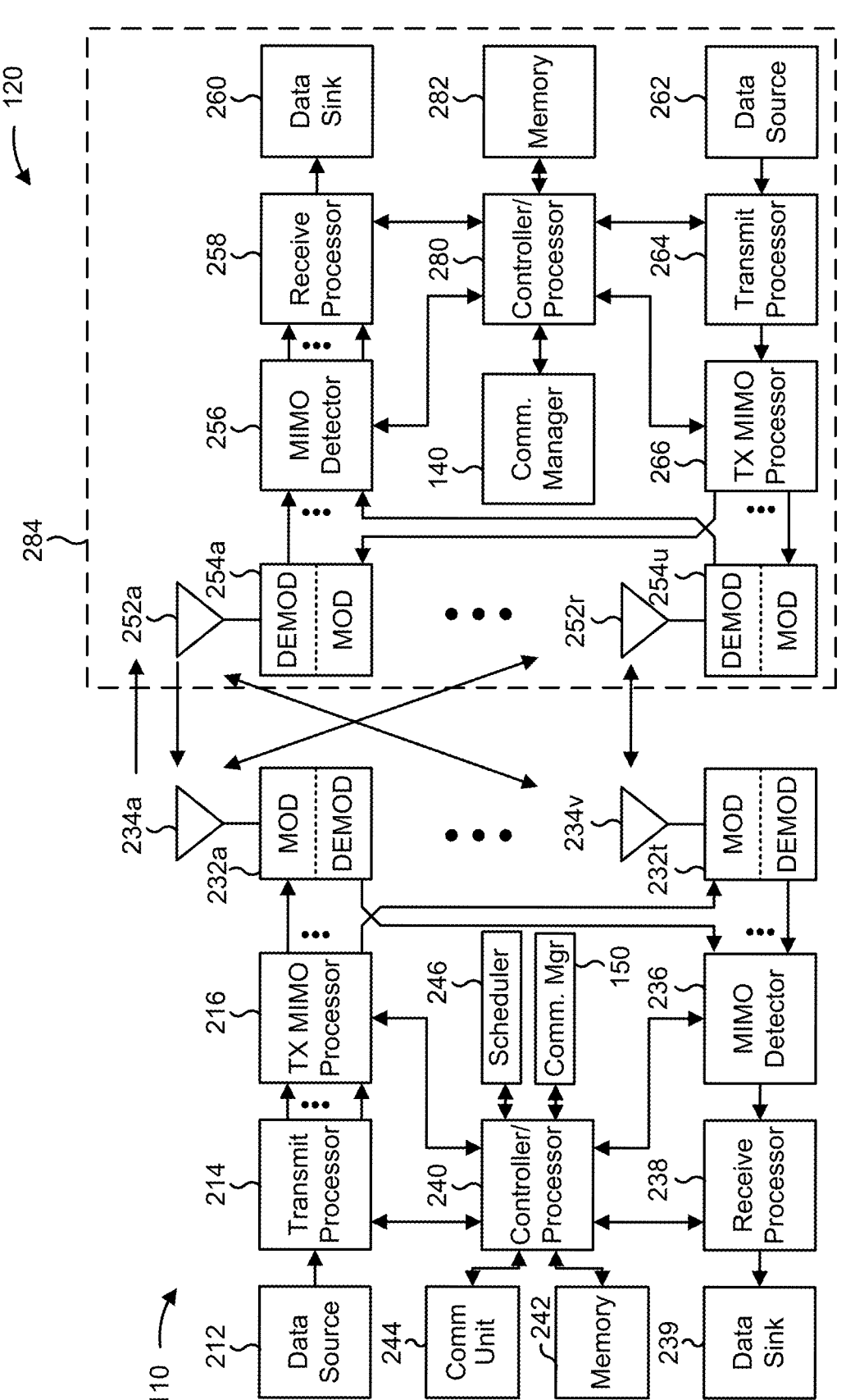
FIG. 2 is a diagram illustrating an example network node in communication with a user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232a through 232t, where t≥1), a set of antennas 234 (shown as 234a through 234v, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing ((OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a channel quality indicator (CQI) parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink SRS, and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254a through 254u may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
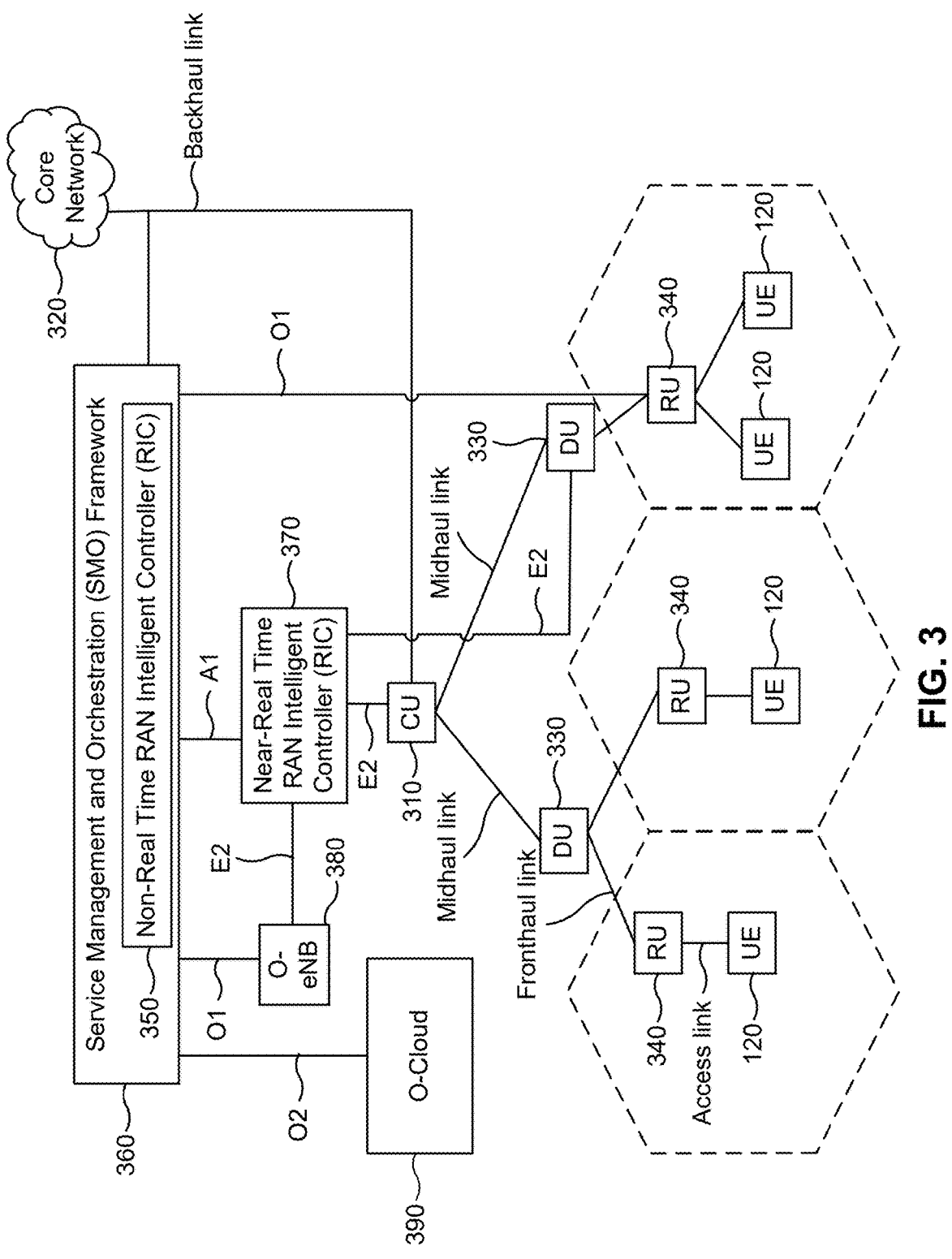
FIG. 3 is a diagram illustrating an example disaggregated base station architecture, in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUS 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU-UP units and one or more CU-CP units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, artificial intelligence and/or machine learning (AI/ML) workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with handling an uplink resource muting pattern that overlaps with a PTRS in an SBFD operation, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 1100 of FIG. 11, process 1200 of FIG. 12, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 1100 of FIG. 11, process 1200 of FIG. 12, or other processes as described herein. In some examples, executing instructions may include running the instructions, converting the instructions, compiling the instructions, and/or interpreting the instructions, among other examples.

In some aspects, a UE (e.g., the UE 120) includes means for receiving a configuration associated with an uplink PTRS; means for receiving an indication of an uplink resource muting pattern, wherein the uplink resource muting pattern overlaps with a PUSCH carrying the uplink PTRS in an SBFD operation; and/or means for performing a handling of the uplink resource muting pattern that overlaps with the PUSCH carrying the uplink PTRS. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting a configuration associated with an uplink PTRS; means for transmitting an indication of an uplink resource muting pattern, wherein the uplink resource muting pattern overlaps with a PUSCH carrying the uplink PTRS in a subband full duplex operation; and/or means for receiving the uplink PTRS based at least in part on a handling of the uplink resource muting pattern that overlaps with the PUSCH carrying the uplink PTRS. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

As indicated above, FIG. 3 is provided as an example. Other examples may differ from what is described with regard to FIG. 3.

An FD operation may involve an IBFD operation, in which a transmission and a reception may occur on the same time and frequency resource. A downlink direction and an uplink direction may share the same IBFD time/frequency resource based at least in part on a full or partial overlap. Alternatively, the FD operation may involve an SBFD (or flexible duplex) operation, in which a transmission and a reception may occur at the same time but on different frequency resources. A downlink resource may be separated from an uplink resource in a frequency domain. In the SBFD operation, no downlink and uplink overlap in frequency may occur.

FIG. 4 is a diagram illustrating examples 400 of FD communications, in accordance with the present disclosure.

As shown by reference number 402, a downlink resource 404 and an uplink resource 406 may share the same IBFD time/frequency resource based at least in part on a full overlap. As shown by reference number 408, a downlink resource 410 and an uplink resource 412 may share the same IBFD time/frequency resource based at least in part on a partial overlap. As shown by reference number 414, a downlink resource 416 and an uplink resource 420 may be associated with a same time but different frequencies. The downlink resource 416 and the uplink resource 420 may be separated by a guard band 418.

As indicated above, FIG. 4 is provided as an example. Other examples may differ from what is described with regard to FIG. 4.

FIG. 5 is a diagram illustrating examples 500 of FD communications, in accordance with the present disclosure.

As shown by reference number 502, an FD network node (e.g., network node 110a) may communicate with half duplex (HD) UEs. The FD network node may be subjected to cross-link interference (CLI) from another FD network node (e.g., network node 110d). The CLI from the other FD network node may be inter-network-node CLI. The FD network node may experience self-interference (SI). The FD network node may receive an uplink transmission from a first HD UE (e.g., UE 120a), and the FD network node may transmit a downlink transmission to a second HD UE (e.g., UE 120e). The FD network node may receive the uplink transmission and transmit the downlink transmission on the same slot (e.g., a simultaneous reception/transmission). The second HD UE may be subjected to CLI from the first HD UE (e.g., inter-UE CLI).

As shown by reference number 504, an FD network node (e.g., network node 110a) may communicate with FD UEs. The FD network node may be subjected to CLI from another FD network node (e.g., network node 110d). The FD network node may experience SI. The FD network node may transmit a downlink transmission to a first FD UE (e.g., UE 120a), and the FD network node may receive an uplink transmission from the first FD UE at the same time as the downlink transmission. The FD network node may transmit a downlink transmission to a second FD UE (e.g., UE 120e). The second HD UE may be subjected to CLI from the first HD UE. The first UE may experience SI.

As shown by reference number 506, a first FD network node (e.g., network node 110a), which may be associated with multiple transmission reception points (TRPs), may communicate with SBFD UEs. The first FD network node may be subjected to CLI from a second FD network node (e.g., network node 110d). The first FD network node may receive an uplink transmission from a first SBFD UE (e.g., UE 120a). The second FD network node may transmit downlink transmissions to both the first SBFD UE and a second SBFD UE (e.g., UE 120e). The second SBFD UE may be subjected to CLI from the first SBFD UE. The first SBFD UE may experience SI.

As shown by reference number 508, an SBFD slot may be associated with a non-overlapping uplink/downlink subband. The SBFD slot may be associated with a simultaneous transmission/reception of a downlink/uplink on a sub-band basis. Within a component carrier bandwidth, an uplink resource 512 may be in between, in a frequency domain, a first downlink resource 510 and a second downlink resource 514. The first downlink resource 510, the second downlink resource 514, and the uplink resource 512 may all be associated with the same time.

An SBFD operation may increase an uplink duty cycle, which may result in a latency reduction (e.g., a downlink signal may be received in uplink-only slots, which may enable latency savings) and uplink coverage improvement. The SBFD operation may improve a system capacity, resource utilization, and/or spectrum efficiency. The SBFD operation may enable a flexible and dynamic uplink/downlink resource adaptation according to uplink/downlink traffic in a robust manner.

As indicated above, FIG. 5 is provided as an example. Other examples may differ from what is described with regard to FIG. 5.

For a network-node-to-network-node co-channel CLI measurement and/or channel measurement (e.g., gNB-to-gNB co-channel CLI measurement and/or channel measurement), an uplink resource muting may be based at least in part on a transparent uplink resource muting or a non-transparent uplink resource muting. The transparent uplink resource muting may avoid a scheduling on a measurement resource. The non-transparent uplink resource muting may define an uplink resource muting pattern with one or more RE or RB muting patterns.

The uplink resource muting for the network-node-to-network-node co-channel CLI measurement and/or channel measurement may be used to measure a network-node-to-network-node (e.g., gNB-to-gNB) CLI level with less interference from an uplink resource. The uplink resource muting may be used to measure a network-node-to-network-node channel with less interference from an uplink resource. The uplink resource muting may be used to measure a network-node-to-network-node CLI interference covariance matrix with less interference from an uplink resource. Transparent uplink resource muting may be supported using network node scheduling. The uplink resource muting may incur an uplink performance loss. A UE complexity and a potential increased peak-to-average power ratio (PAPR) impact of non-contiguous uplink transmissions may be considered when introducing non-transparent uplink resource muting.

Uplink resource muting may be used to support an inter-network-node CLI measurement (e.g., inter-gNB CLI measurement). Different uplink blank/muting resources may be used to measure spatial characteristics of network-node-to-network-node CLI caused by various downlink signals and to avoid cross link interference. An uplink resource muting pattern may be different for various downlink channels and/or downlink signals. For the network-node-to-network-node co-channel CLI measurement, muting REs in an uplink slot at a position of REs of a synchronization signal block (SSB), a system information block type 1 (SIB1), and a broadcast physical downlink control channel (PDCCH) from an aggressive cell may be supported to measure spatial characteristics of a downlink broadcast interference. Muting REs in an uplink slot at a position of REs of a unicast physical downlink shared channel (PDSCH) and PDCCH from an aggressive cell may be supported to obtain spatial characteristics of unicast PDSCH and PDCCH CLI. Muting REs in an uplink slot at a position of REs of a non-zero-power (NZP) channel state information reference signal (CSI-RS) from an aggressive cell may be supported to avoid strong CLI.

A PTRS may be used for tracking a phase of a local oscillator at a receiver and a transmitter. Phase tracking may enable a suppression of phase noise and common phase error, which may be useful at high carrier frequencies such as millimeter waves. Due to properties of phase noise, the PTRS may have a relatively low density in a frequency domain but a relatively high density in a time domain. For a PTRS in a downlink direction, the PTRS may be associated with one DMRS port and may be confined to a scheduled bandwidth and duration of a PDSCH/PUSCH. After a PTRS port is associated with a DMRS port, the PTRS may be transmitted with the same subcarrier as an associated DMRS, and the same sequence with the DMRS may be repeated for the PTRS in a slot. For a PTRS in an uplink direction, one or two PTRS ports may be scheduled based at least in part on a UE capability. Two PTRS ports may be used for a non/partial-coherent uplink transmission, with two local oscillators in a UE (e.g., when the UE is equipped with two or more transmission panels for the uplink direction). When the UE has reported the capability of supporting a full-coherent uplink transmission, only a single PTRS port may be used.

PTRS tones may be transmitted according to times and frequencies specified by parameters L and K, respectively, in accordance with various PTRS patterns. When L=1, a PTRS may be transmitted on every PDSCH symbol. When L=2, a PTRS may be transmitted on one symbol every two PDSCH symbols. When L=4, a PTRS may be transmitted on one symbol every four PDSCH symbols. When K=4, one PTRS tone may be transmitted every four RBs. When K=2, one PTRS tone may be transmitted every two RBs. A PTRS pattern may be designed to have a relatively good frequency diversity (e.g., a uniform distribution of PTRSs over a frequency domain).

FIG. 6 is a diagram illustrating an example 600 of PTRS patterns, in accordance with the present disclosure.

As shown by reference number 602, a PTRS pattern may be associated with K=2 and L=1. In this case, one PTRS tone may be transmitted every two RBs, and a PTRS may be transmitted on every PDSCH symbol. As shown by reference number 604, a PTRS pattern may be associated with K=2 and L=2. In this case, one PTRS tone may be transmitted every two RBs, and a PTRS may be transmitted on one symbol every two PDSCH symbols. As shown by reference number 606, a PTRS pattern may be associated with K=4 and L=1. In this case, one PTRS tone may be transmitted every four RBs, and a PTRS may be transmitted on every PDSCH symbol.

As indicated above, FIG. 6 is provided as an example. Other examples may differ from what is described with regard to FIG. 6.

An uplink PTRS for a DFT-s-OFDM waveform may be supported. A possible PTRS presence/absence may be configured using an uplink PTRS present transform precoding (UL-PTRS-present-transform-precoding) RRC parameter. Multiple patterns/densities of PTRS for DFT-s-OFDM may be supported. A pre-DFT PTRS insertion for an uplink DFT-s-OFDM may be in the form of multiple chunks per symbol. Supported chunk sizes K may be 2 and 4, which may be an implicit configuration depending on an MCS and an allocated bandwidth. A supported number of chunks per DFT-s-OFDM symbol X may be 2, 4, and 8, where X may implicitly depend on the allocated bandwidth, the MCS and/or a K value. A time domain PTRS density may be configured by an uplink PTRS time density transform precoding (UL-PTRS-time-density-transform-precoding) RRC parameter, where supported time densities may be $\{1, 2\}$. The time domain PTRS density may be based at least in part on every PUSCH carrying symbol or every other PUSCH carrying symbol.

Figure 7:
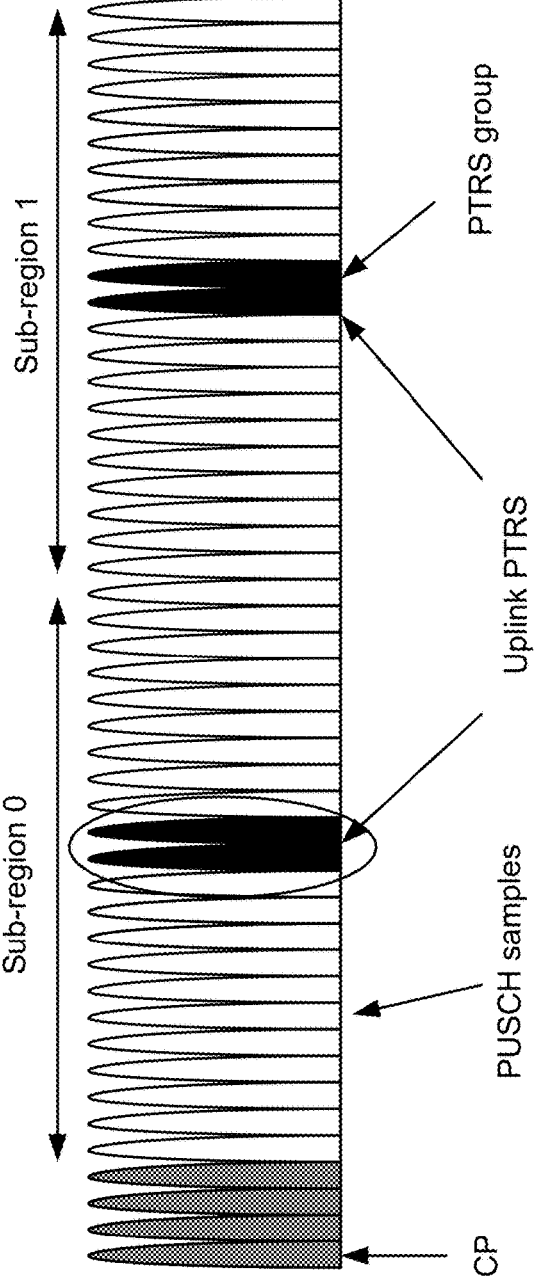
FIG. 7 is a diagram illustrating an example of a PTRS insertion, in accordance with the present disclosure.

FIG. 7 is a diagram illustrating an example 700 of a PTRS insertion, in accordance with the present disclosure.

As shown in FIG. 7, in a pre-DFT PTRS insertion for an uplink DFT-s-OFDM in the form of multiple chunks per symbol, a supported chunk size (K) may be 2 and a supported number of chunks per DFT-s-OFDM symbol (X) may be 2. A first sub region may include a first PTRS group and a second sub region may include a second PTRS group, where each PTRS group may be associated with an uplink PTRS. The first PTRS group and the second PTRS group may be separated by PUSCH samples.

As indicated above, FIG. 7 is provided as an example. Other examples may differ from what is described with regard to FIG. 7.

For an uplink direction, one or two PTRS ports may be scheduled based at least in part on a UE capability. Two PTRS ports may be used for a non/partial-coherent uplink transmission, with two local oscillators in a UE. When the UE has reported a capability of supporting a full-coherent uplink transmission, only a single PTRS port may be used. When the UE is scheduled with $Q_p = \{1, 2\}$ PTRS ports in the uplink direction, a PTRS power may be boosted according to a number of PUSCH layers. A power boosting value may be different for different transmission schemes. The power boosting value may be different depending on which transmission codebook (e.g., full/partial or non-coherent) is used. A PTRS uplink configuration may include an uplink PTRS power (ptrs-Power) higher layer parameter set to $\{00, 01, \ldots\}$, which may indicate different options to be used for power boosting. The uplink PTRS power higher layer parameter may indicate an uplink PTRS power boosting factor per PTRS port.

Different PTRS power boosting values (in dB) may be defined, depending on a number of PUSCH layers and a type of codebook. The number of PUSCH layers may be $\{1, 2, 3, 4\}$. The type of codebook may be full coherent, partial coherent, partial and non-coherent and non-codebook based, and/or non-coherent and non-codebook based.

Figure 8:
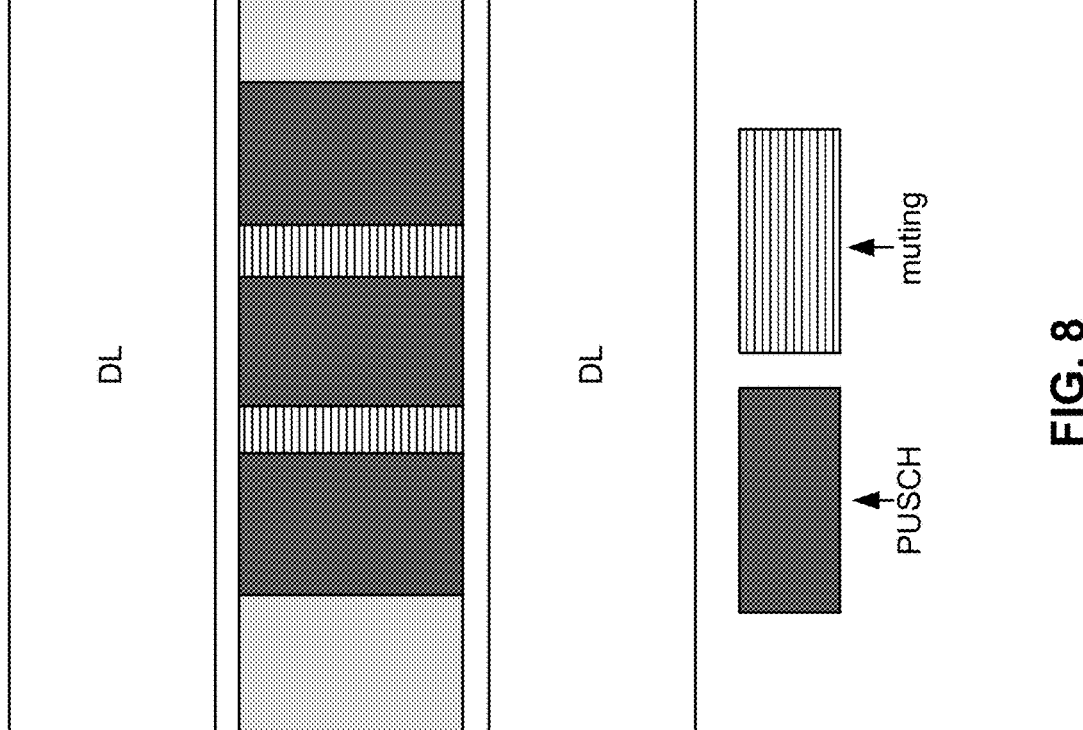
FIG. 8 is a diagram illustrating an example of an uplink resource muting pattern that overlaps with a physical uplink shared channel (PUSCH) carrying a PTRS, in accordance with the present disclosure.

FIG. 8 is a diagram illustrating an example 800 of an uplink resource muting pattern that overlaps with a PUSCH carrying a PTRS, in accordance with the present disclosure.

As shown in FIG. 8, a UE may be configured with an uplink resource muting pattern, where the uplink resource muting pattern may overlap with a PUSCH carrying a PTRS signal. The uplink resource muting pattern and the PUSCH carrying the PTRS signal may overlap in an uplink resource, where the uplink resource may be associated with an SBFD slot. The SBFD slot may include a first downlink resource, a second downlink resource, and the uplink resource in between the first downlink resource and the second downlink resource in a frequency domain, where the uplink resource is associated with the uplink resource muting pattern overlapping with the PUSCH carrying the PTRS signal.

The UE may not be configured to handle this overlapping scenario. The UE may not be configured to handle a situation in which the UE is configured with the uplink resource muting pattern that overlaps with the PUSCH carrying the PTRS signal. Due to the uplink resource muting pattern, certain uplink resources may be muted, and such uplink resources may overlap with the PUSCH carrying the PTRS signal, thereby preventing the PTRS signal from being conveyed. Further, the PTRS may be used for phase error tracking, so the UE may not consider an impact on performance when handling the overlapping scenario. Due to an inability to handle the overlapping scenario, the UE may suffer from a phase error tracking degradation, thereby negatively affecting an overall performance of the UE.

As indicated above, FIG. 8 is provided as an example. Other examples may differ from what is described with regard to FIG. 8.

In various aspects of techniques and apparatuses described herein, a UE may receive, from a network node, a configuration associated with an uplink PTRS. The UE may receive, from the network node, an indication of an uplink resource muting pattern. The uplink resource muting pattern may overlap (e.g., in time and/or in frequency) with a PUSCH carrying the uplink PTRS in an SBFD operation. The network node may be associated with an FD operation. The UE may perform a handling of the uplink resource muting pattern that overlaps with the PUSCH carrying the uplink PTRS. For example, the UE may prioritize the uplink resource muting pattern over the uplink PTRS. Alternatively, the UE may prioritize the uplink PTRS over the uplink resource muting pattern. The UE may transmit, to the network node, the uplink PTRS via the PUSCH based at least in part on the uplink PTRS being prioritized over the uplink resource muting pattern in accordance with the handling. Alternatively, the UE may mute an uplink resource using the uplink resource muting pattern based at least in part on the uplink resource muting pattern being prioritized over the uplink PTRS in accordance with the handling.

In some aspects, by configuring the UE to be able to handle an overlapping scenario in which the uplink resource muting pattern overlaps with the PUSCH carrying the uplink PTRS, the UE may be able to transmit the uplink PTRS and/or mute an uplink resource using the uplink resource muting pattern. The uplink PTRS may be on separate symbols and/or on separate REs of a same symbol based at least in part on the handling, as opposed to colliding with each other, which may improve an overall performance of the UE. In some cases, the UE may handle the overlapping scenario depending on a priority of the uplink PTRS in relation to a priority of the uplink resource muting pattern. Further, in some cases, the UE may still be able to transmit the uplink PTRS based at least in part on the handling, which may improve a phase error tracking for the UE.

Figure 9:
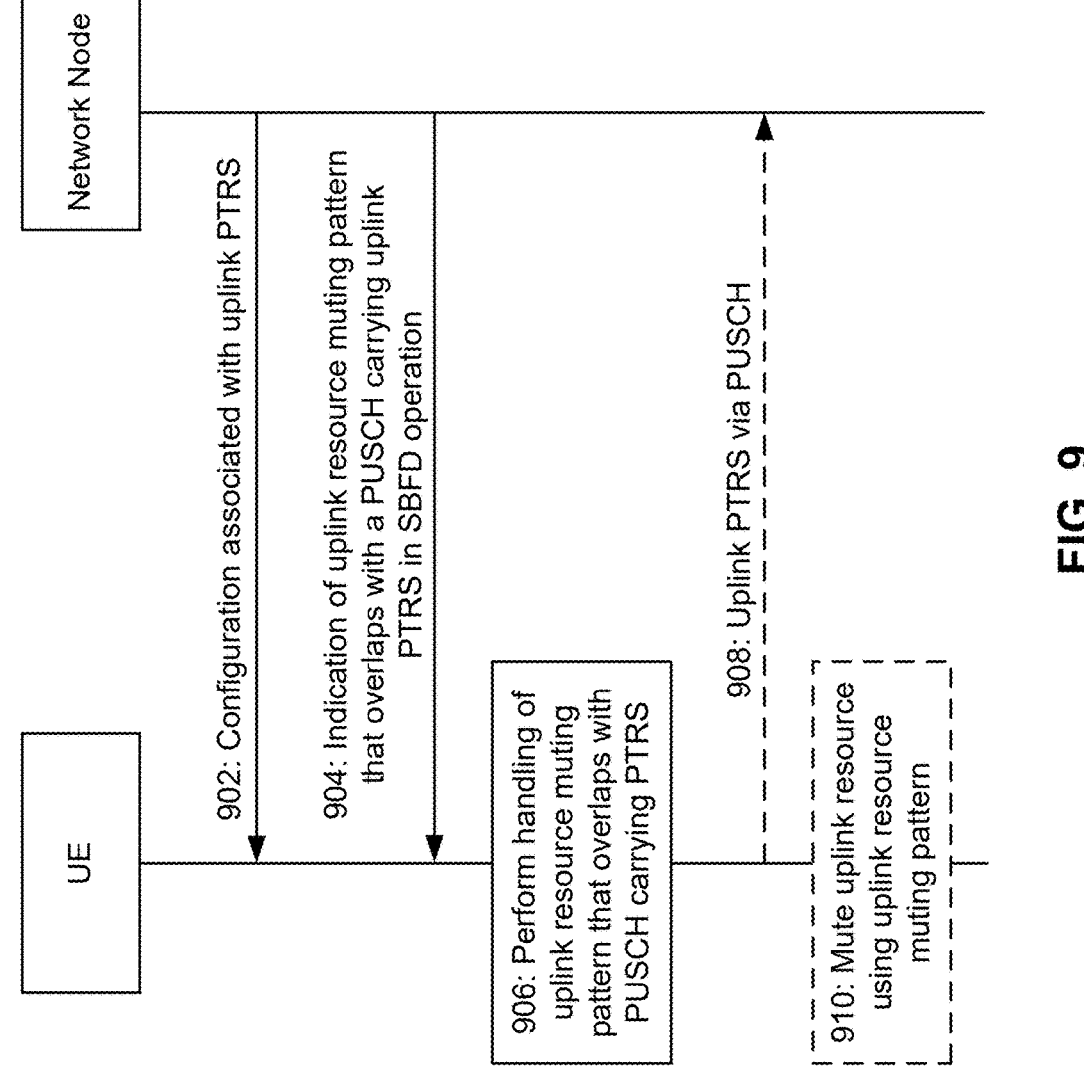
FIGS. 9-10 are diagrams illustrating examples associated with handling an uplink resource muting pattern that overlaps with a PTRS in a subband full duplex (SBFD) operation, in accordance with the present disclosure.

FIG. 9 is a diagram illustrating an example 900 of handling an uplink resource muting pattern that overlaps with a PTRS in an SBFD operation, in accordance with the present disclosure. As shown in FIG. 9, example 900 includes communication between a UE (e.g., UE 120) and a network node (e.g., network node 110). In some aspects, the UE and the network node may be included in a wireless network, such as wireless network 100. The network node may be associated with an FD operation.

As shown by reference number 902, the UE may receive, from the network node, a configuration associated with an uplink PTRS. The configuration may indicate a time density, indicated by parameter L, and a frequency density, indicated by parameter K, associated with the uplink PTRS.

As shown by reference number 904, the UE may receive, from the network node, an indication of an uplink resource muting pattern. The uplink resource muting pattern may indicate particular uplink resources that the UE should mute, where the UE may use such muted uplink resources to measure spatial characteristics of a network-node-to-network-node CLI caused by various downlink signals and to avoid CLI. The uplink resource muting pattern may be for various downlink channels and/or downlink signals. The UE may receive, from the network node, an indication to activate the uplink resource muting pattern. In some aspects, the uplink resource muting pattern may overlap with a PUSCH carrying the uplink PTRS in an SBFD operation. The overlap may be in a time domain and/or in a frequency domain.

As shown by reference number 906, the UE may perform a handling of the uplink resource muting pattern that overlaps with the PUSCH carrying the uplink PTRS. When performing the handling, the UE may perform an appropriate action to resolve the overlap between the uplink resource muting pattern and the PUSCH carrying the uplink PTRS. For example, the UE may prioritize the uplink resource muting pattern over the uplink PTRS. Alternatively, the UE may prioritize the uplink PTRS over the uplink resource muting pattern. In some cases, the UE may allow both the uplink resource muting pattern and the uplink PTRS, as long as uplink muting resources and the uplink PTRS are associated with different symbols and/or different REs of a same symbol.

In some aspects, the PUSCH that carries the uplink PTRS may be associated with CP-OFDM. In some aspects, the UE may prohibit the uplink resource muting pattern from overlapping with the uplink PTRS on a same symbol. In some aspects, the UE may allow the uplink resource muting pattern to overlap with the uplink PTRS on a same symbol. The UE may limit the uplink resource muting pattern and the uplink PTRS to different REs. In some aspects, the UE may prioritize the uplink resource muting pattern over the uplink PTRS, where a PTRS symbol may be skipped based at least in part on the PTRS symbol overlapping with a muting RE. In some aspects, the UE may prioritize the uplink PTRS over the uplink resource muting pattern based at least in part on the uplink resource muting pattern colliding with the uplink PTRS on one or more REs, where uplink muting may be skipped for the one or more REs.

In some aspects, for a CP-OFDM uplink signal with PTRS, an overlap of an uplink resource muting pattern with a PUSCH transmission may be handled. In a first option, the uplink resource muting pattern may not be allowed to overlap with PTRS symbols. When a PTRS is configured on every PUSCH symbol, uplink resource muting may be skipped for this PUSCH transmission. Otherwise, only PUSCH symbols without a PTRS may have uplink resource muting. Alternatively, a PTRS configuration may be defined (e.g., a PTRS uplink resource muting configuration), where the PTRS configuration may only be active when uplink resource muting is active. Such a configuration may be RRC designed to not overlap with the uplink resource muting pattern. In a second option, the uplink resource muting pattern may be allowed on a PTRS symbol when the overlap is resolved by a proper configuration by the network node (e.g., the uplink resource muting pattern and the PTRS symbol are not configured on same REs). Alternatively, the uplink resource muting pattern may be allowed on the PTRS symbol when the overlap is resolved by an RE offset of the PTRS that is incremented to avoid overlap with the uplink resource muting pattern. In a third option, the uplink resource muting pattern may be given a higher priority than PTRS, and a PTRS symbol may be skipped when the PTRS symbol overlaps with muting REs. Such an option may have a negative impact on phase error tracking. In a fourth option, when the uplink resource muting pattern collides with a PTRS on the same REs, the PTRS may be prioritized. In this option, the PTRS may be given a higher priority than the uplink resource muting pattern.

In some aspects, the PUSCH that carries the uplink PTRS may be associated with DFT-s-OFDM. In some aspects, the UE may prohibit uplink resource muting on the PUSCH. In some aspects, the UE may drop the uplink PTRS based at least in part on the uplink resource muting pattern overlapping with the PUSCH. In some aspects, the UE may prioritize the uplink PTRS based at least in part on the uplink resource muting pattern overlapping with the PUSCH, where no uplink muting may be performed on overlapped resources.

In some aspects, in an overlap with a PTRS in a DFT-s-OFDM, for a DFT-s-OFDM PUSCH, an uplink PTRS may be inserted in a time domain before a DFT, so an uplink resource muting (puncturing in this case) may have a negative impact on the uplink PTRS. In a first option, an uplink resource muting may not be allowed on a DFT-s-OFDM PUSCH, which may be avoided by a network configuration, otherwise considered as an error case. In a second option, when an uplink resource muting pattern overlaps with a DFT-s-OFDM PUSCH, PTRS samples may be dropped. In this case, no uplink PTRS may be transmitted. In a third option, when an uplink resource muting pattern overlaps with a DFT-s-OFDM PUSCH, PTRS samples may be prioritized. In this case, no uplink resource muting may occur on overlapped resources.

As shown by reference number 908, the UE may transmit, to the network node, the uplink PTRS via the PUSCH based at least in part on the uplink PTRS being prioritized over the uplink resource muting pattern in accordance with the handling. In this case, the UE may not mute uplink resources, and instead, may transmit the uplink PTRS.

As shown by reference number 910, the UE may mute an uplink resource using the uplink resource muting pattern based at least in part on the uplink resource muting pattern being prioritized over the uplink PTRS in accordance with the handling. In this case, the UE may not transmit the uplink PTRS, and instead, may mute the uplink resource in accordance with the uplink resource muting pattern.

In some aspects, the uplink resource muting pattern and the uplink PTRS may be allowed on a same symbol and may be configured on different REs. In some aspects, the UE may boost powers of remaining uplink shared channel REs to compensate for muted REs. In some aspects, the UE may boost a power of the uplink PTRS to compensate for muted REs. The power of the uplink PTRS may be boosted based at least in part on an implicit power boosting in addition to a legacy PTRS power boost factor, or the power of the uplink PTRS may be boosted using a separate power boost factor to be used when the uplink PTRS overlaps with the uplink resource muting pattern.

In some aspects, the uplink resource muting pattern and the uplink PTRS may be allowed on the same symbol but configured on different REs. In a first option, in order to keep a same per-symbol power across PUSCH symbols, remaining uplink shared channel (UL-SCH) REs may be power boosted to compensate for muted REs. In a second option, in order to keep the same per-symbol power across PUSCH symbols, the uplink PTRS may be power boosted to compensate for muted REs. A PTRS power boosting may be based at least in part on an implicit power boosting, in addition to a legacy PTRS power boost factor. Alternatively, a separate power boosting factor may be defined in a specification for when the uplink PTRS overlaps with the uplink resource muting.

As indicated above, FIG. 9 is provided as an example. Other examples may differ from what is described with regard to FIG. 9.

Figure 10:
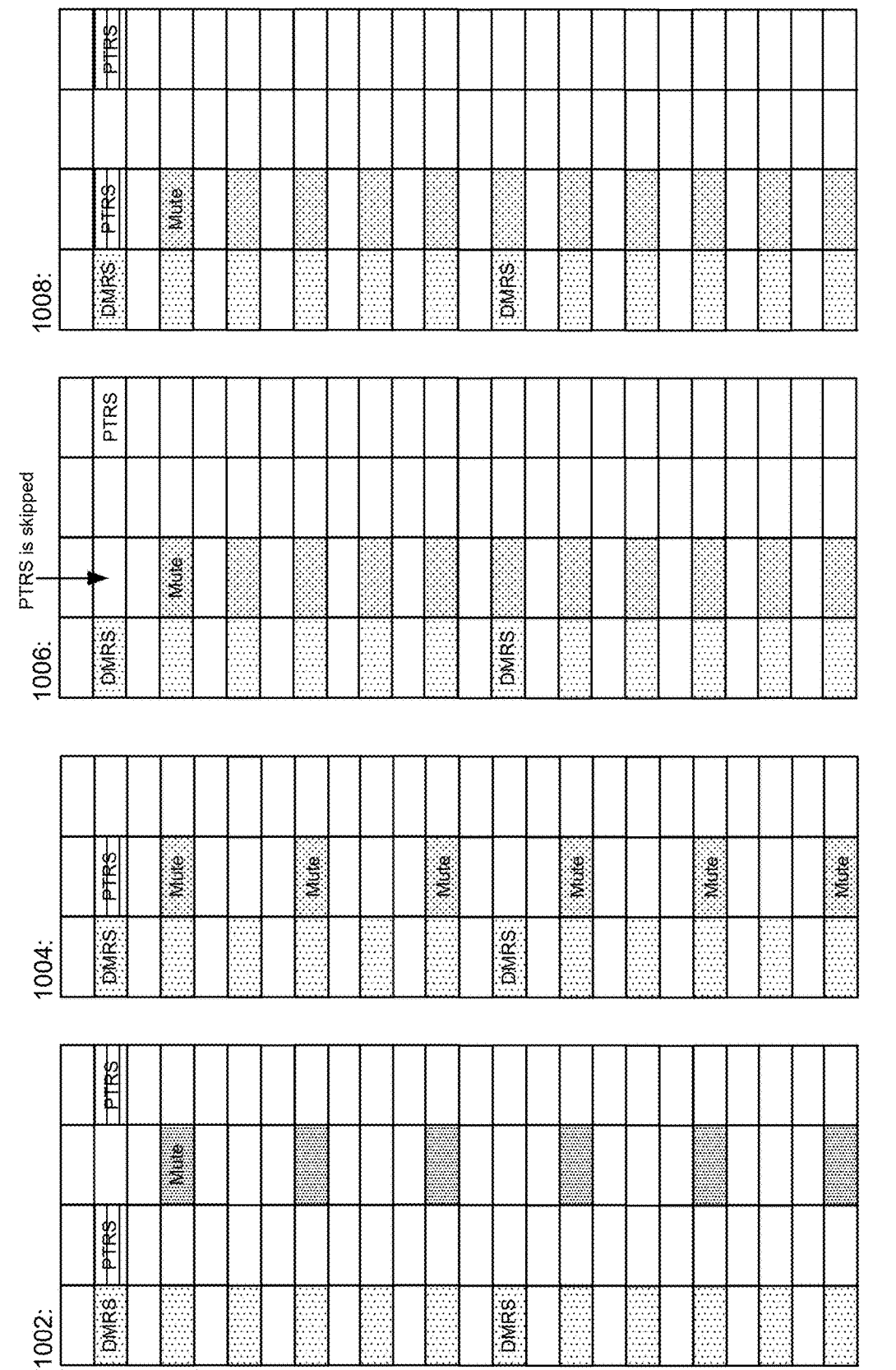

FIG. 10 is a diagram illustrating an example 1000 of handling an uplink resource muting pattern that overlaps with a PTRS in an SBFD operation, in accordance with the present disclosure.

As shown by reference number 1002, in a first option, an uplink resource muting pattern may not be allowed to overlap with PTRS symbols. In the first option, no uplink resource muting and PTRS may be allowed on the same symbol. As shown by reference number 1004, in a second option, an uplink resource muting pattern may be allowed on a PTRS symbol as long as an overlap is resolved. In the second option, no uplink resource muting and PTRS may be allowed on the same RE (e.g., the uplink resource muting and the PTRS may be associated with the same symbol, but different REs). As shown by reference number 1006, in a third option, an uplink resource muting pattern may be given a higher priority and a PTRS symbol may be skipped when overlapping with muting REs. In the third option, a PTRS may be skipped. As shown by reference number 1008, in a fourth option, a PTRS may be given a higher priority, and an uplink resource muting pattern colliding with the PTRS on some REs may be skipped. In the fourth option, an uplink resource muting may be skipped.

As indicated above, FIG. 10 is provided as an example. Other examples may differ from what is described with regard to FIG. 10.

FIG. 11 is a diagram illustrating an example process 1100 performed, for example, at a UE or an apparatus of a UE, in accordance with the present disclosure. Example process 1100 is an example where the apparatus or the UE (e.g., UE 120) performs operations associated with handling an uplink resource muting pattern that overlaps with a PTRS in an SBFD operation.

As shown in FIG. 11, in some aspects, process 1100 may include receiving a configuration associated with an uplink PTRS (block 1110). For example, the UE (e.g., using reception component 1302 and/or communication manager 1306, depicted in FIG. 13) may receive a configuration associated with an uplink PTRS, as described above in connection with FIGS. 9-10.

As further shown in FIG. 11, in some aspects, process 1100 may include receiving an indication of an uplink resource muting pattern, wherein the uplink resource muting pattern overlaps with a PUSCH carrying the uplink PTRS in a subband full duplex operation (block 1120). For example, the UE (e.g., using reception component 1302 and/or communication manager 1306, depicted in FIG. 13) may receive an indication of an uplink resource muting pattern, wherein the uplink resource muting pattern overlaps with a PUSCH carrying the uplink PTRS in a subband full duplex operation, as described above in connection with FIGS. 9-10.

As further shown in FIG. 11, in some aspects, process 1100 may include performing a handling of the uplink resource muting pattern that overlaps with the PUSCH carrying the uplink PTRS (block 1130). For example, the UE (e.g., using communication manager 1306, depicted in FIG. 13) may perform a handling of the uplink resource muting pattern that overlaps with the PUSCH carrying the uplink PTRS, as described above in connection with FIGS. 9-10.

Process 1100 may include additional aspects, such as any single aspect or any combination of aspects described below and/or in connection with one or more other processes described elsewhere herein.

In a first aspect, process 1100 includes transmitting the uplink PTRS via the PUSCH based at least in part on the uplink PTRS being prioritized over the uplink resource muting pattern in accordance with the handling.

In a second aspect, process 1100 includes muting an uplink resource using the uplink resource muting pattern based at least in part on the uplink resource muting pattern being prioritized over the uplink PTRS in accordance with the handling.

In a third aspect, the PUSCH that carries the uplink PTRS is associated with CP-OFDM.

In a fourth aspect, process 1100 includes prohibiting the uplink resource muting pattern from overlapping with the uplink PTRS on a same symbol.

In a fifth aspect, process 1100 includes allowing the uplink resource muting pattern to overlap with the uplink PTRS on a same symbol, and limiting the uplink resource muting pattern and the uplink PTRS to different REs.

In a sixth aspect, process 1100 includes prioritizing the uplink resource muting pattern over the uplink PTRS, and a PTRS symbol is skipped based at least in part on the PTRS symbol overlapping with a muting RE.

In a seventh aspect, process 1100 includes prioritizing the uplink PTRS over the uplink resource muting pattern based at least in part on the uplink resource muting pattern colliding with the uplink PTRS on one or more REs, and uplink muting is skipped for the one or more REs.

In an eighth aspect, the PUSCH that carries the uplink PTRS is associated with DFT-s-OFDM.

In a ninth aspect, process 1100 includes prohibiting uplink resource muting on the PUSCH.

In a tenth aspect, process 1100 includes dropping the uplink PTRS based at least in part on the uplink resource muting pattern overlapping with the PUSCH.

In an eleventh aspect, process 1100 includes prioritizing the uplink PTRS based at least in part on the uplink resource muting pattern overlapping with the PUSCH, and no uplink muting is performed on overlapped resources.

In a twelfth aspect, the uplink resource muting pattern and the uplink PTRS are allowed on a same symbol and are configured on different REs, and process 1100 includes boosting powers of remaining uplink shared channel REs to compensate for muted REs.

In a thirteenth aspect, the uplink resource muting pattern and the uplink PTRS are allowed on a same symbol and are configured on different REs, and process 1100 includes boosting a power of the uplink PTRS to compensate for muted REs, wherein the power of the uplink PTRS is boosted based at least in part on an implicit power boosting in addition to a legacy PTRS power boost factor, or the power of the uplink PTRS is boosted using a separate power boost factor to be used when the uplink PTRS overlaps with the uplink resource muting pattern.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, at a network node or an apparatus of a network node, in accordance with the present disclosure. Example process 1200 is an example where the apparatus or the network node (e.g., network node 110) performs operations associated with handling an uplink resource muting pattern that overlaps with a PTRS in an SBFD operation.

As shown in FIG. 12, in some aspects, process 1200 may include transmitting a configuration associated with an uplink PTRS (block 1210). For example, the network node (e.g., using transmission component 1404 and/or communication manager 1406, depicted in FIG. 14) may transmit a configuration associated with an uplink PTRS, as described above in connection with FIGS. 9-10.

As further shown in FIG. 12, in some aspects, process 1200 may include transmitting an indication of an uplink resource muting pattern, wherein the uplink resource muting pattern overlaps with a PUSCH carrying the uplink PTRS in an SBFD operation (block 1220). For example, the network node (e.g., using transmission component 1404 and/or communication manager 1406, depicted in FIG. 14) may transmit an indication of an uplink resource muting pattern, wherein the uplink resource muting pattern overlaps with a PUSCH carrying the uplink PTRS in an SBFD operation, as described above in connection with FIGS. 9-10.

As further shown in FIG. 12, in some aspects, process 1200 may include receiving the uplink PTRS based at least in part on a handling of the uplink resource muting pattern that overlaps with the PUSCH carrying the uplink PTRS (block 1230). For example, the network node (e.g., using reception component 1402 and/or communication manager 1406, depicted in FIG. 14) may receive the uplink PTRS based at least in part on a handling of the uplink resource muting pattern that overlaps with the PUSCH carrying the uplink PTRS, as described above in connection with FIGS. 9-10.

Process 1200 may include additional aspects, such as any single aspect or any combination of aspects described below and/or in connection with one or more other processes described elsewhere herein.

In a first aspect, process 1200 includes receiving the uplink PTRS via the PUSCH based at least in part on the uplink PTRS being prioritized over the uplink resource muting pattern in accordance with the handling.

In a second aspect, the PUSCH that carries the uplink PTRS is associated with CP-OFDM.

In a third aspect, the uplink resource muting pattern is prohibited from overlapping with the uplink PTRS on a same symbol in accordance with the handling.

In a fourth aspect, the uplink resource muting pattern is allowed to overlap with the uplink PTRS on a same symbol, and the uplink resource muting pattern and the uplink PTRS are limited to different REs, in accordance with the handling.

In a fifth aspect, the uplink PTRS is prioritized over the uplink resource muting pattern based at least in part on the uplink resource muting pattern colliding with the uplink PTRS on one or more REs, and uplink muting is skipped for the one or more REs, in accordance with the handling.

In a sixth aspect, the PUSCH that carries the uplink PTRS is associated with DFT-s-OFDM.

In a seventh aspect, uplink resource muting is prohibited on the PUSCH in accordance with the handling.

In an eighth aspect, the uplink PTRS is prioritized based at least in part on the uplink resource muting pattern overlapping with the PUSCH, and no uplink muting is performed on overlapped resources, in accordance with the handling.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
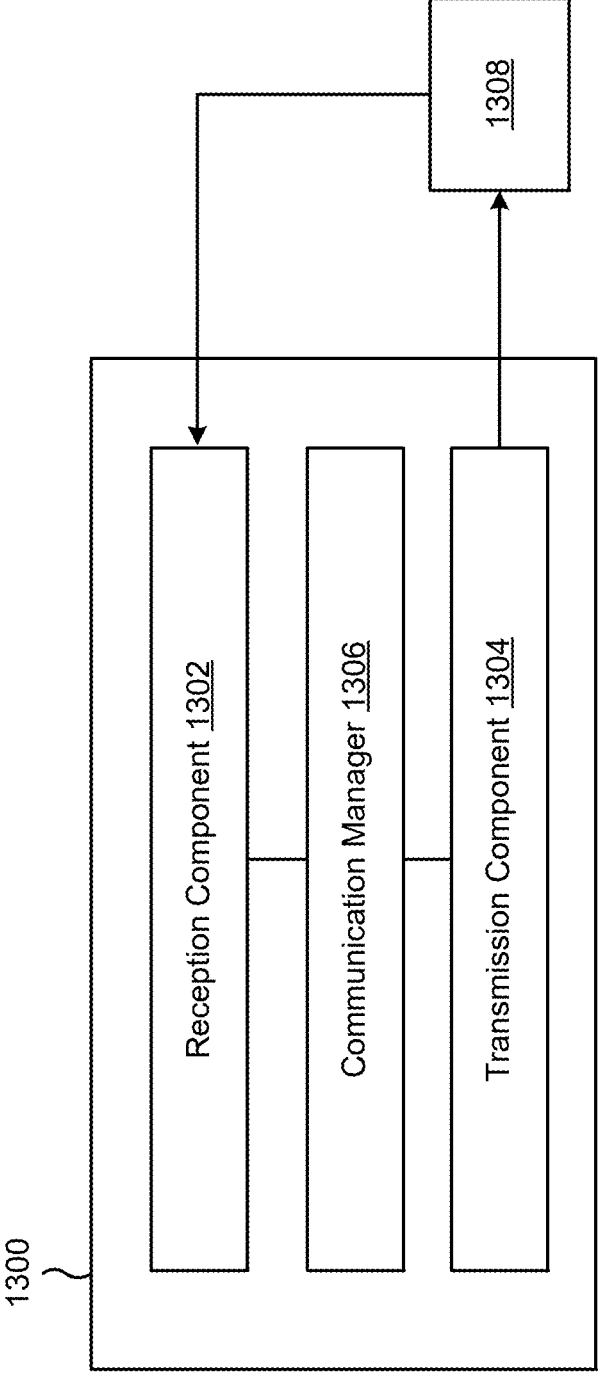
FIGS. 13-14 are diagrams of example apparatuses for wireless communication, in accordance with the present disclosure.

FIG. 13 is a diagram of an example apparatus 1300 for wireless communication, in accordance with the present disclosure. The apparatus 1300 may be a UE, or a UE may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 140 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 9-10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1304 may be co-located with the reception component 1302 in one or more transceivers.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The reception component 1302 may receive a configuration associated with an uplink PTRS. The reception component 1302 may receive an indication of an uplink resource muting pattern, wherein the uplink resource muting pattern overlaps with a PUSCH carrying the uplink PTRS in a subband full duplex operation. The communication manager 1306 may perform a handling of the uplink resource muting pattern that overlaps with the PUSCH carrying the uplink PTRS. The transmission component 1304 may transmit the uplink PTRS via the PUSCH based at least in part on the uplink PTRS being prioritized over the uplink resource muting pattern in accordance with the handling. The communication manager 1306 may mute an uplink resource using the uplink resource muting pattern based at least in part on the uplink resource muting pattern being prioritized over the uplink PTRS in accordance with the handling.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
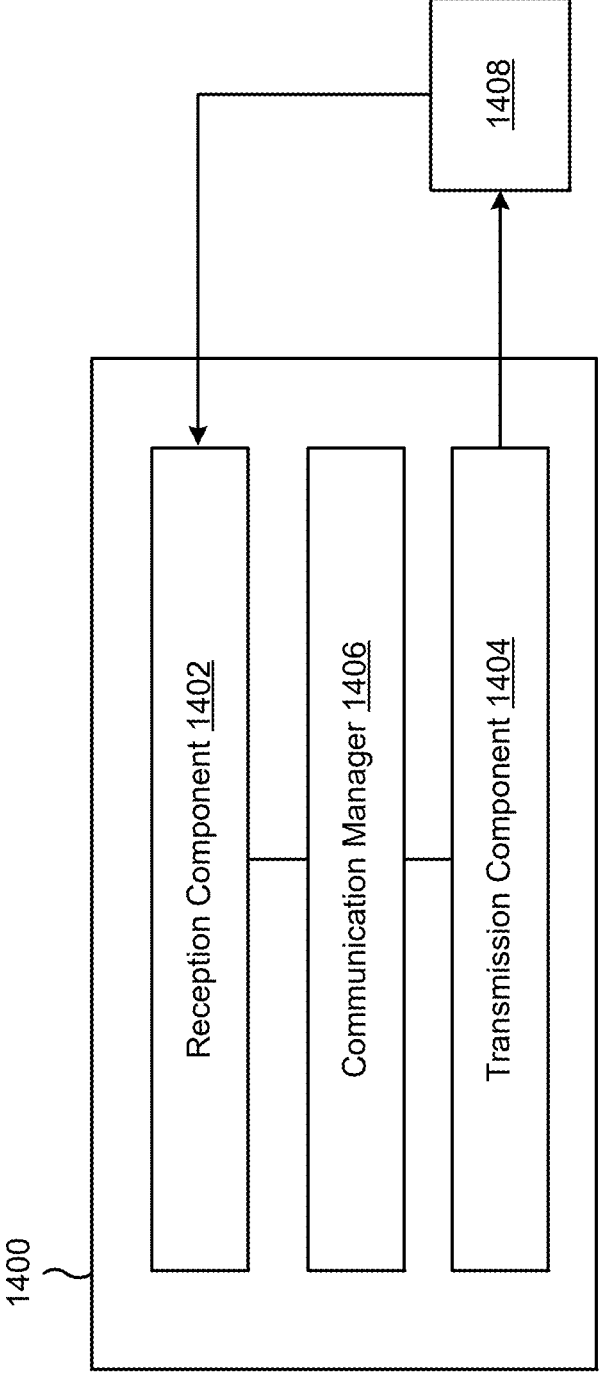

FIG. 14 is a diagram of an example apparatus 1400 for wireless communication, in accordance with the present disclosure. The apparatus 1400 may be a network node, or a network node may include the apparatus 1400. In some aspects, the apparatus 1400 includes a reception component 1402, a transmission component 1404, and/or a communication manager 1406, which may be in communication with one another (for example, via one or more buses and/or one or more other components). In some aspects, the communication manager 1406 is the communication manager 150 described in connection with FIG. 1. As shown, the apparatus 1400 may communicate with another apparatus 1408, such as a UE or a network node (such as a CU, a DU, an RU, or a base station), using the reception component 1402 and the transmission component 1404.

In some aspects, the apparatus 1400 may be configured to perform one or more operations described herein in connection with FIGS. 9-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the network node described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1402 may receive communications, such as reference signals, control information, data communications, or a combination thereof, from the apparatus 1408. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1402 and/or the transmission component 1404 may include or may be included in a network interface. The network interface may be configured to obtain and/or output signals for the apparatus 1400 via one or more communications links, such as a backhaul link, a midhaul link, and/or a fronthaul link.

The transmission component 1404 may transmit communications, such as reference signals, control information, data communications, or a combination thereof, to the apparatus 1408. In some aspects, one or more other components of the apparatus 1400 may generate communications and may provide the generated communications to the transmission component 1404 for transmission to the apparatus 1408. In some aspects, the transmission component

1404 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1404 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1404 may be co-located with the reception component 1402 in one or more transceivers.

The communication manager 1406 may support operations of the reception component 1402 and/or the transmission component 1404. For example, the communication manager 1406 may receive information associated with configuring reception of communications by the reception component 1402 and/or transmission of communications by the transmission component 1404. Additionally, or alternatively, the communication manager 1406 may generate and/or provide control information to the reception component 1402 and/or the transmission component 1404 to control reception and/or transmission of communications.

The transmission component 1404 may transmit a configuration associated with an uplink PTRS. The transmission component 1404 may transmit an indication of an uplink resource muting pattern, wherein the uplink resource muting pattern overlaps with a PUSCH carrying the uplink PTRS in a subband full duplex operation. The reception component 1402 may receive the uplink PTRS based at least in part on a handling of the uplink resource muting pattern that overlaps with the PUSCH carrying the uplink PTRS. The reception component 1402 may receive the uplink PTRS via the PUSCH based at least in part on the uplink PTRS being prioritized over the uplink resource muting pattern in accordance with the handling.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving a configuration associated with an uplink phase tracking reference signal (PTRS); receiving an indication of an uplink resource muting pattern, wherein the uplink resource muting pattern overlaps with a physical uplink shared channel (PUSCH) carrying the uplink PTRS in a subband full duplex operation; and performing a handling of the uplink resource muting pattern that overlaps with the PUSCH carrying the uplink PTRS.

Aspect 2: The method of Aspect 1, further comprising: transmitting the uplink PTRS via the PUSCH based at least in part on the uplink PTRS being prioritized over the uplink resource muting pattern in accordance with the handling.

Aspect 3: The method of any of Aspects 1-2, further comprising: muting an uplink resource using the uplink resource muting pattern based at least in part on the uplink resource muting pattern being prioritized over the uplink PTRS in accordance with the handling.

Aspect 4: The method of any of Aspects 1-3, wherein the PUSCH that carries the uplink PTRS is associated with cyclic prefix orthogonal frequency division multiplexing (CP-OFDM).

Aspect 5: The method of any of Aspects 1-4, wherein performing the handling further comprises: prohibiting the uplink resource muting pattern from overlapping with the uplink PTRS on a same symbol.

Aspect 6: The method of any of Aspects 1-5, wherein performing the handling further comprises: allowing the uplink resource muting pattern to overlap with the uplink PTRS on a same symbol; and limiting the uplink resource muting pattern and the uplink PTRS to different resource elements.

Aspect 7: The method of any of Aspects 1-6, wherein performing the handling further comprises: prioritizing the uplink resource muting pattern over the uplink PTRS, wherein a PTRS symbol is skipped based at least in part on the PTRS symbol overlapping with a muting resource element.

Aspect 8: The method of any of Aspects 1-7, wherein performing the handling further comprises: prioritizing the uplink PTRS over the uplink resource muting pattern based at least in part on the uplink resource muting pattern colliding with the uplink PTRS on one or more resource elements (REs), wherein uplink muting is skipped for the one or more REs.

Aspect 9: The method of any of Aspects 1-8, wherein the PUSCH that carries the uplink PTRS is associated with discrete Fourier transform spread orthogonal frequency division multiplexing (DFT-s-OFDM).

Aspect 10: The method of any of Aspects 1-9, wherein performing the handling further comprises: prohibiting uplink resource muting on the PUSCH.

Aspect 11: The method of any of Aspects 1-10, wherein performing the handling further comprises: dropping the uplink PTRS based at least in part on the uplink resource muting pattern overlapping with the PUSCH.

Aspect 12: The method of any of Aspects 1-11, wherein performing the handling further comprises: prioritizing the uplink PTRS based at least in part on the uplink resource muting pattern overlapping with the PUSCH, wherein no uplink muting is performed on overlapped resources.

Aspect 13: The method of any of Aspects 1-12, wherein the uplink resource muting pattern and the uplink PTRS are allowed on a same symbol and are configured on different resource elements (REs), and further comprising: boosting powers of remaining uplink shared channel REs to compensate for muted REs.

Aspect 14: The method of any of Aspects 1-13, wherein the uplink resource muting pattern and the uplink PTRS are allowed on a same symbol and are configured on different resource elements (REs), and further comprising: boosting a power of the uplink PTRS to compensate for muted REs, wherein the power of the uplink PTRS is boosted based at least in part on an implicit power boosting in addition to a legacy PTRS power boost factor, or the power of the uplink PTRS is boosted using a separate power boost factor to be used when the uplink PTRS overlaps with the uplink resource muting pattern.

Aspect 15: A method of wireless communication performed by a network node, comprising: transmitting a configuration associated with an uplink phase tracking reference signal (PTRS); transmitting an indication of an uplink resource muting pattern, wherein the uplink resource muting pattern overlaps with a physical uplink shared channel (PUSCH) carrying the uplink PTRS in a subband full duplex operation; and receiving the uplink PTRS based at least in part on a handling of the uplink resource muting pattern that overlaps with the PUSCH carrying the uplink PTRS.

Aspect 16: The method of Aspect 15, further comprising: receiving the uplink PTRS via the PUSCH based at least in part on the uplink PTRS being prioritized over the uplink resource muting pattern in accordance with the handling.

Aspect 17: The method of any of Aspects 15-16, wherein the PUSCH that carries the uplink PTRS is associated with cyclic prefix orthogonal frequency division multiplexing (CP-OFDM).

Aspect 18: The method of any of Aspects 15-17, wherein the uplink resource muting pattern is prohibited from overlapping with the uplink PTRS on a same symbol in accordance with the handling.

Aspect 19: The method of any of Aspects 15-18, wherein the uplink resource muting pattern is allowed to overlap with the uplink PTRS on a same symbol, and the uplink resource muting pattern and the uplink PTRS are limited to different resource elements, in accordance with the handling.

Aspect 20: The method of any of Aspects 15-19, wherein the uplink PTRS is prioritized over the uplink resource muting pattern based at least in part on the uplink resource muting pattern colliding with the uplink PTRS on one or more resource elements (REs), and uplink muting is skipped for the one or more REs, in accordance with the handling.

Aspect 21: The method of any of Aspects 15-20, wherein the PUSCH that carries the uplink PTRS is associated with discrete Fourier transform spread orthogonal frequency division multiplexing (DFT-s-OFDM).

Aspect 22: The method of any of Aspects 15-21, wherein uplink resource muting is prohibited on the PUSCH in accordance with the handling.

Aspect 23: The method of any of Aspects 15-22, wherein the uplink PTRS is prioritized based at least in part on the uplink resource muting pattern overlapping with the PUSCH, and no uplink muting is performed on overlapped resources, in accordance with the handling.

Aspect 24: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-14.

Aspect 25: An apparatus for wireless communication at a device, the apparatus comprising one or more memories and one or more processors coupled to the one or more memories, the one or more processors configured to cause the device to perform the method of one or more of Aspects 1-14.

Aspect 26: An apparatus for wireless communication, the apparatus comprising at least one means for performing the method of one or more of Aspects 1-14.

Aspect 27: A non-transitory computer-readable medium storing code for wireless communication, the code comprising instructions executable by one or more processors to perform the method of one or more of Aspects 1-14.

Aspect 28: A non-transitory computer-readable medium storing a set of instructions for wireless communication, the set of instructions comprising one or more instructions that, when executed by one or more processors of a device, cause the device to perform the method of one or more of Aspects 1-14.

Aspect 29: A device for wireless communication, the device comprising a processing system that includes one or more processors and one or more memories coupled with the one or more processors, the processing system configured to cause the device to perform the method of one or more of Aspects 1-14.

Aspect 30: An apparatus for wireless communication at a device, the apparatus comprising one or more memories and one or more processors coupled to the one or more memories, the one or more processors individually or collectively configured to cause the device to perform the method of one or more of Aspects 1-14.

Aspect 31: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 15-23.

Aspect 32: An apparatus for wireless communication at a device, the apparatus comprising one or more memories and one or more processors coupled to the one or more memories, the one or more processors configured to cause the device to perform the method of one or more of Aspects 15-23.

Aspect 33: An apparatus for wireless communication, the apparatus comprising at least one means for performing the method of one or more of Aspects 15-23.

Aspect 34: A non-transitory computer-readable medium storing code for wireless communication, the code comprising instructions executable by one or more processors to perform the method of one or more of Aspects 15-23.

Aspect 35: A non-transitory computer-readable medium storing a set of instructions for wireless communication, the set of instructions comprising one or more instructions that, when executed by one or more processors of a device, cause the device to perform the method of one or more of Aspects 15-23.

Aspect 36: A device for wireless communication, the device comprising a processing system that includes one or more processors and one or more memories coupled with the one or more processors, the processing system configured to cause the device to perform the method of one or more of Aspects 15-23.

Aspect 37: An apparatus for wireless communication at a device, the apparatus comprising one or more memories and one or more processors coupled to the one or more memories, the one or more processors individually or collectively configured to cause the device to perform the method of one or more of Aspects 15-23.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a user equipment (UE), comprising:

memory; and one or more processors, coupled to the memory, configured to cause the UE to:

receive a configuration associated with an uplink phase tracking reference signal (PTRS);

receive an indication of an uplink resource muting pattern, wherein the uplink resource muting pattern overlaps with a physical uplink shared channel (PUSCH) carrying the uplink PTRS in a subband full duplex slot; and perform a handling of the uplink resource muting pattern that overlaps with the PUSCH carrying the uplink PTRS.

2. The apparatus of claim 1, wherein the one or more processors are further configured to cause the UE to:

transmit the uplink PTRS via the PUSCH based at least in part on the uplink PTRS being prioritized over the uplink resource muting pattern in accordance with the handling.

3. The apparatus of claim 1, wherein the one or more processors are further configured to cause the UE to:

mute an uplink resource using the uplink resource muting pattern based at least in part on the uplink resource muting pattern being prioritized over the uplink PTRS in accordance with the handling.

4. The apparatus of claim 1, wherein the PUSCH that carries the uplink PTRS is associated with cyclic prefix orthogonal frequency division multiplexing (CP-OFDM).

5. The apparatus of claim 1, wherein the one or more processors, to perform the handling, are further configured to cause the UE to:

prohibit the uplink resource muting pattern from overlapping with the uplink PTRS on a same symbol.

6. The apparatus of claim 1, wherein the one or more processors, to perform the handling, are further configured to cause the UE to:

allow the uplink resource muting pattern to overlap with the uplink PTRS on a same symbol; and limit the uplink resource muting pattern and the uplink PTRS to different resource elements.

7. The apparatus of claim 1, wherein the one or more processors, to perform the handling, are further configured to cause the UE to:

prioritize the uplink resource muting pattern over the uplink PTRS, wherein a PTRS symbol is skipped based at least in part on the PTRS symbol overlapping with a muting resource element.

8. The apparatus of claim 1, wherein the one or more processors, to perform the handling, are further configured to cause the UE to:

prioritize the uplink PTRS over the uplink resource muting pattern based at least in part on the uplink resource muting pattern colliding with the uplink PTRS on one or more resource elements (REs), wherein uplink muting is skipped for the one or more REs.

9. The apparatus of claim 1, wherein the PUSCH that carries the uplink PTRS is associated with discrete Fourier transform spread orthogonal frequency division multiplexing (DFT-s-OFDM).

10. The apparatus of claim 1, wherein the one or more processors, to perform the handling, are further configured to cause the UE to:

prohibit uplink resource muting on the PUSCH.

11. The apparatus of claim 1, wherein the one or more processors, to perform the handling, are further configured to cause the UE to:

drop the uplink PTRS based at least in part on the uplink resource muting pattern overlapping with the PUSCH.

12. The apparatus of claim 1, wherein the one or more processors, to perform the handling, are further configured to cause the UE to:

prioritize the uplink PTRS based at least in part on the uplink resource muting pattern overlapping with the PUSCH, wherein no uplink muting is performed on overlapped resources.

13. The apparatus of claim 1, wherein the uplink resource muting pattern and the uplink PTRS are allowed on a same symbol and are configured on different resource elements (REs), and the one or more processors are further configured to cause the UE to:

boost powers of remaining uplink shared channel REs to compensate for muted REs.

14. The apparatus of claim 1, wherein the uplink resource muting pattern and the uplink PTRS are allowed on a same symbol and are configured on different resource elements (REs), and the one or more processors are further configured to cause the UE to:

boost a power of the uplink PTRS to compensate for muted REs, wherein the power of the uplink PTRS is boosted based at least in part on an implicit power boosting in addition to a legacy PTRS power boost factor, or the power of the uplink PTRS is boosted using a separate power boost factor to be used when the uplink PTRS overlaps with the uplink resource muting pattern.

15. An apparatus for wireless communication at a network node, comprising:

one or more memories; and one or more processors, coupled to the one or more memories, configured to cause the network node to:

transmit a configuration associated with an uplink phase tracking reference signal (PTRS);

transmit an indication of an uplink resource muting pattern, wherein the uplink resource muting pattern overlaps with a physical uplink shared channel (PUSCH) carrying the uplink PTRS in a subband full duplex slot; and receive the uplink PTRS based at least in part on a handling of the uplink resource muting pattern that overlaps with the PUSCH carrying the uplink PTRS.

16. The apparatus of claim 15, wherein the one or more processors, to perform the handling, are further configured to cause the network node to:

receive the uplink PTRS via the PUSCH based at least in part on the uplink PTRS being prioritized over the uplink resource muting pattern in accordance with the handling.

17. The apparatus of claim 15, wherein:

the PUSCH that carries the uplink PTRS is associated with cyclic prefix orthogonal frequency division multiplexing (CP-OFDM); or the PUSCH that carries the uplink PTRS is associated with discrete Fourier transform spread orthogonal frequency division multiplexing (DFT-s-OFDM).

18. The apparatus of claim 15, wherein:

the uplink resource muting pattern is prohibited from overlapping with the uplink PTRS on a same symbol in accordance with the handling; or the uplink resource muting pattern is allowed to overlap with the uplink PTRS on a same symbol, and the uplink resource muting pattern and the uplink PTRS are limited to different resource elements, in accordance with the handling.

19. The apparatus of claim 15, wherein the uplink PTRS is prioritized over the uplink resource muting pattern based at least in part on the uplink resource muting pattern colliding with the uplink PTRS on one or more resource elements (REs), and uplink muting is skipped for the one or more REs, in accordance with the handling.

20. The apparatus of claim 15, wherein:

uplink resource muting is prohibited on the PUSCH in accordance with the handling; or the uplink PTRS is prioritized based at least in part on the uplink resource muting pattern overlapping with the PUSCH, and no uplink muting is performed on overlapped resources, in accordance with the handling.

21. A method of wireless communication performed by a user equipment (UE), comprising:

receiving a configuration associated with an uplink phase tracking reference signal (PTRS);

receiving an indication of an uplink resource muting pattern, wherein the uplink resource muting pattern overlaps with a physical uplink shared channel (PUSCH) carrying the uplink PTRS in a subband full duplex slot; and performing a handling of the uplink resource muting pattern that overlaps with the PUSCH carrying the uplink PTRS.

22. The method of claim 21, further comprising:

transmitting the uplink PTRS via the PUSCH based at least in part on the uplink PTRS being prioritized over the uplink resource muting pattern in accordance with the handling; or muting an uplink resource using the uplink resource muting pattern based at least in part on the uplink resource muting pattern being prioritized over the uplink PTRS in accordance with the handling.

23. The method of claim 21, wherein:

the PUSCH that carries the uplink PTRS is associated with cyclic prefix orthogonal frequency division multiplexing (CP-OFDM); or the PUSCH that carries the uplink PTRS is associated with discrete Fourier transform spread orthogonal frequency division multiplexing (DFT-s-OFDM).

24. The method of claim 21, wherein performing the handling further comprises:

prohibiting the uplink resource muting pattern from overlapping with the uplink PTRS on a same symbol.

25. The method of claim 21, wherein performing the handling further comprises:

allowing the uplink resource muting pattern to overlap with the uplink PTRS on a same symbol; and limiting the uplink resource muting pattern and the uplink PTRS to different resource elements.

26. The method of claim 21, wherein performing the handling further comprises:

prioritizing the uplink resource muting pattern over the uplink PTRS, wherein a PTRS symbol is skipped based at least in part on the PTRS symbol overlapping with a muting resource element; or prioritizing the uplink PTRS over the uplink resource muting pattern based at least in part on the uplink resource muting pattern colliding with the uplink PTRS on one or more resource elements (REs), wherein uplink muting is skipped for the one or more REs.

27. The method of claim 21, wherein performing the handling further comprises:

prohibiting uplink resource muting on the PUSCH;

dropping the uplink PTRS based at least in part on the uplink resource muting pattern overlapping with the PUSCH; or prioritizing the uplink PTRS based at least in part on the uplink resource muting pattern overlapping with the PUSCH, wherein no uplink muting is performed on overlapped resources.

28. The method of claim 21, wherein the uplink resource muting pattern and the uplink PTRS are allowed on a same symbol and are configured on different resource elements (REs), and further comprising:

boosting powers of remaining uplink shared channel REs to compensate for muted REs; or boosting a power of the uplink PTRS to compensate for muted REs, wherein the power of the uplink PTRS is boosted based at least in part on an implicit power boosting in addition to a legacy PTRS power boost factor, or the power of the uplink PTRS is boosted using a separate power boost factor to be used when the uplink PTRS overlaps with the uplink resource muting pattern.

29. A method of wireless communication performed by a network node, comprising:

transmitting a configuration associated with an uplink phase tracking reference signal (PTRS);

transmitting an indication of an uplink resource muting pattern, wherein the uplink resource muting pattern overlaps with a physical uplink shared channel (PUSCH) carrying the uplink PTRS in a subband full duplex slot; and receiving the uplink PTRS based at least in part on a handling of the uplink resource muting pattern that overlaps with the PUSCH carrying the uplink PTRS.

30. The method of claim 29, further comprising:

receiving the uplink PTRS via the PUSCH based at least in part on the uplink PTRS being prioritized over the uplink resource muting pattern in accordance with the handling.

* * * * *